United States Patent [19]

Hix et al.

[11] Patent Number: 5,790,084
[45] Date of Patent: Aug. 4, 1998

[54] ELECTRONIC TRANSPARENCY METHOD AND APPARATUS

[75] Inventors: Steven R. Hix, Lake Oswego; Paul E. Gulick; Robert E. Haas, both of Tualatin, all of Oreg.

[73] Assignee: In Focus Systems, Inc., Wilsonville, Oreg.

[21] Appl. No.: 390,937

[22] Filed: Feb. 17, 1995

(Under 37 CFR 1.47)

Related U.S. Application Data

[62] Division of Ser. No. 701,446, May 15, 1991, abandoned, which is a division of Ser. No. 233,285, Aug. 17, 1988, Pat. No. 5,101,197.

[51] Int. Cl.$^6$ .................................................. C09G 5/00
[52] U.S. Cl. ........................... 345/7; 345/87; 345/158; 348/744; 349/5; 353/21
[58] Field of Search ........................ 345/7, 87, 158; 348/744, 749, 761, 766, 790; 359/53, 54, 55, 48; 353/21, 25, 46; 349/5, 6, 7, 11

[56] References Cited

U.S. PATENT DOCUMENTS

| | | |
|---|---|---|
| 4,639,225 | 1/1987 | Washizuka . |
| 4,652,101 | 3/1987 | Grunwald . |
| 4,656,521 | 4/1987 | Trzeciak et al. . |
| 4,680,674 | 7/1987 | Moore ............................ 340/700 |
| 4,693,557 | 9/1987 | Ferguson . |
| 4,739,396 | 4/1988 | Hyatt . |
| 4,746,979 | 5/1988 | Kashigi . |
| 4,754,204 | 6/1988 | Ando et al. . |
| 4,755,869 | 7/1988 | Tanaka . |
| 4,755,883 | 7/1988 | Uehira ............................ 348/734 |
| 4,756,604 | 7/1988 | Nakatsuka et al. . |
| 4,763,993 | 8/1988 | Vogeley et al. . |
| 4,771,275 | 9/1988 | Sanders . |
| 4,782,397 | 11/1988 | Kimoto . |
| 4,841,368 | 6/1989 | Rumbolt et al. ............... 348/734 |
| 4,846,694 | 7/1989 | Erhandt . |
| 4,875,064 | 10/1989 | Umeda et al. . |
| 4,882,599 | 11/1989 | Grunwald . |
| 4,908,876 | 3/1990 | Deforest et al. . |
| 4,936,656 | 6/1990 | Yamashita et al. .............. 340/784 |
| 4,944,578 | 7/1990 | Denison ........................... 345/7 |
| 5,299,039 | 3/1994 | Bohannon ......................... 359/53 |

FOREIGN PATENT DOCUMENTS 2559923  8/1985  France ............................ 345/7

*Primary Examiner*—Richard Hjerpe
*Assistant Examiner*—Mike Fatahiyar
*Attorney, Agent, or Firm*—Stoel Rives LLP

[57] ABSTRACT

An electronic transparency device is provided with a memory in which a plurality of frames of video data ("slides") can be stored. The apparatus includes a control microprocessor which can cause predefined sequences of slides to be presented on the LCD panel automatically. These slide "shows" are defined by the user using a hand held remote control unit in conjunction with menus displayed on the LCD panel in window fashion by the microprocessor. The user can specify the duration that each slide in a sequence is to be shown, the video transition by which it is to be introduced, the degree of "windowshading" with which it is to be displayed, etc. Once a show is defined, it can be instituted and controlled from the remote control unit. Among other numerous features, the transparency also includes a pointer that can be superimposed on the display and controlled by the remote control unit. This pointer can be used to define certain portions of the screen that are to be displayed in highlighted fashion.

21 Claims, 23 Drawing Sheets

Microfiche Appendix Included
(1 Microfiche, 77 Pages)

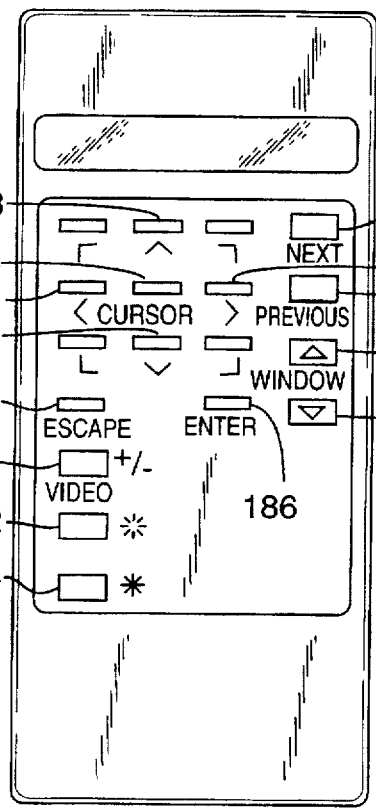
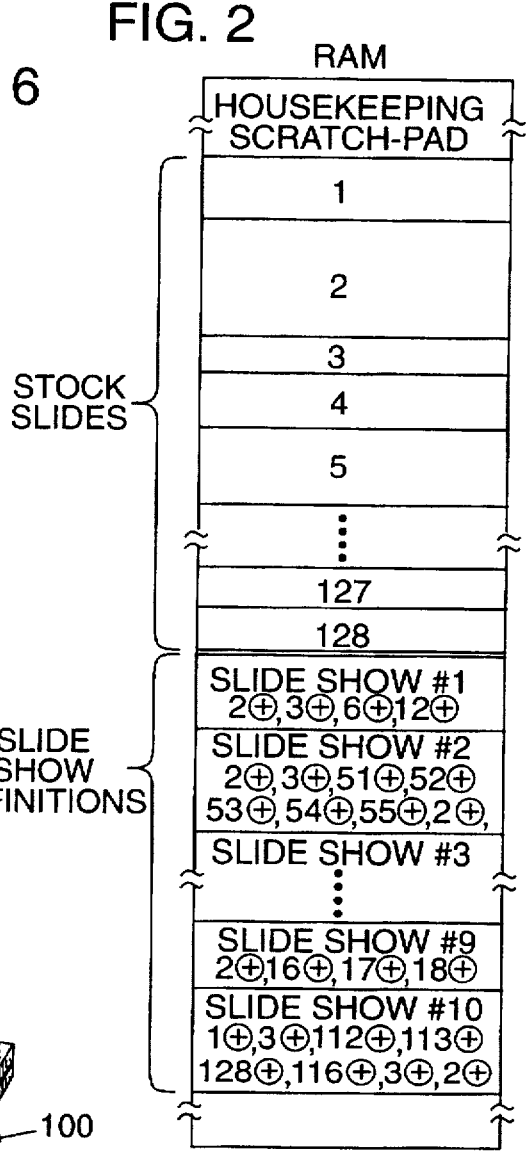
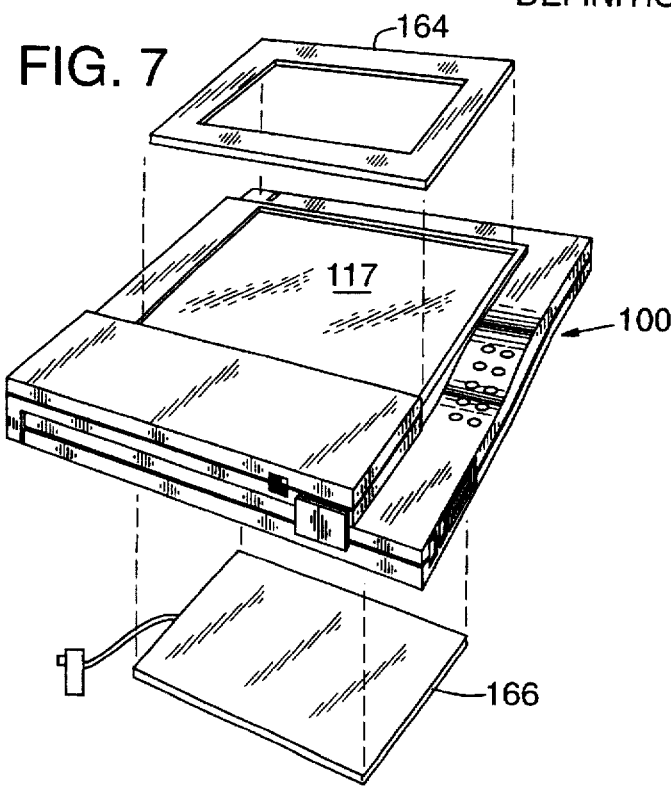

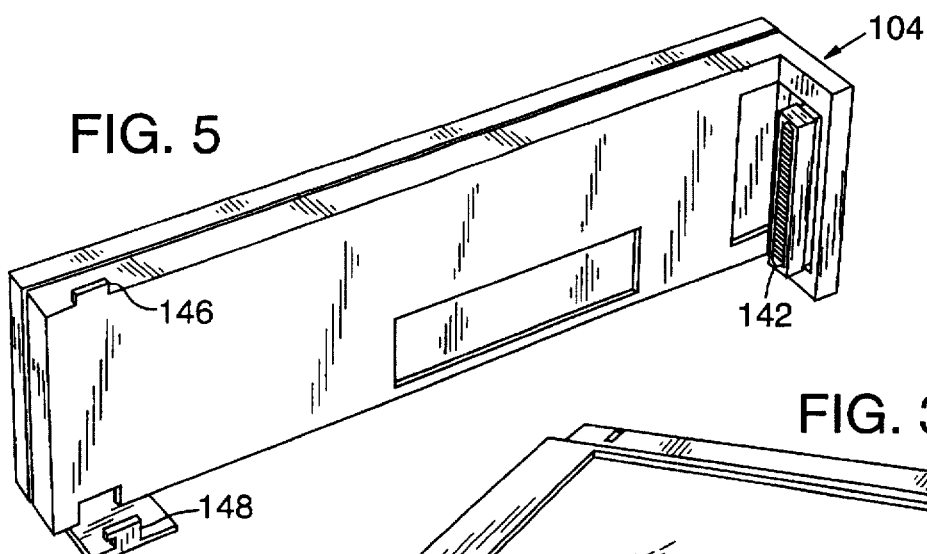
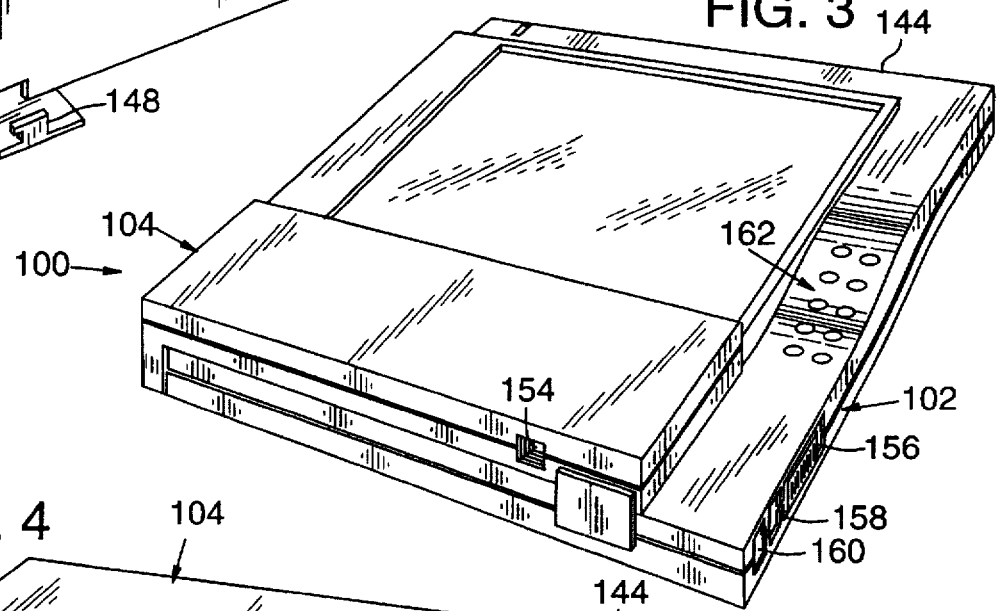
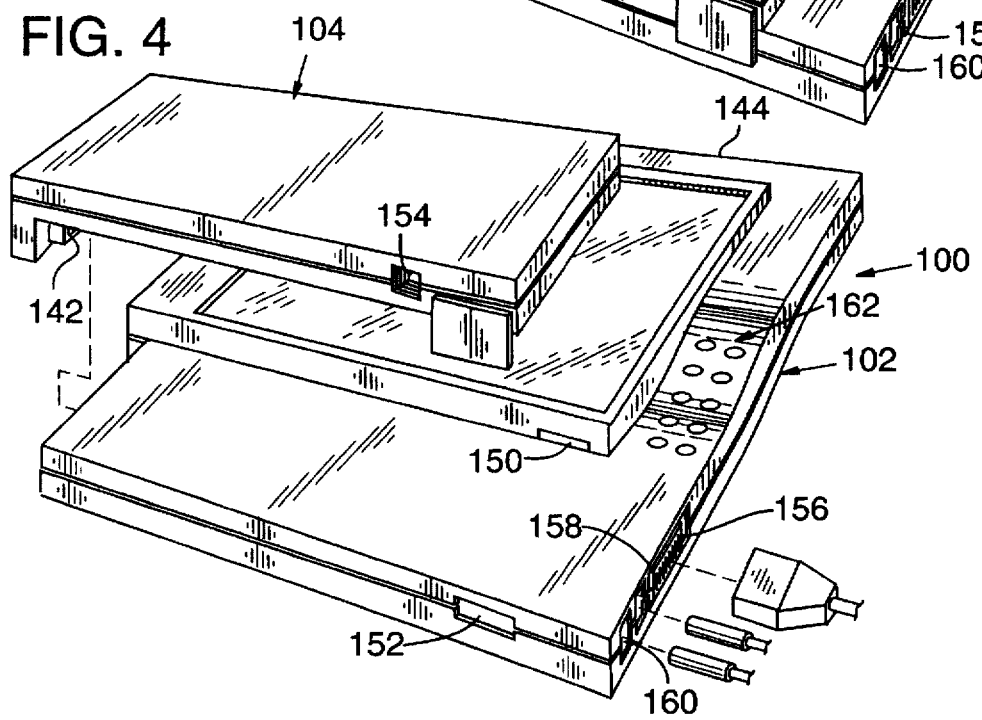

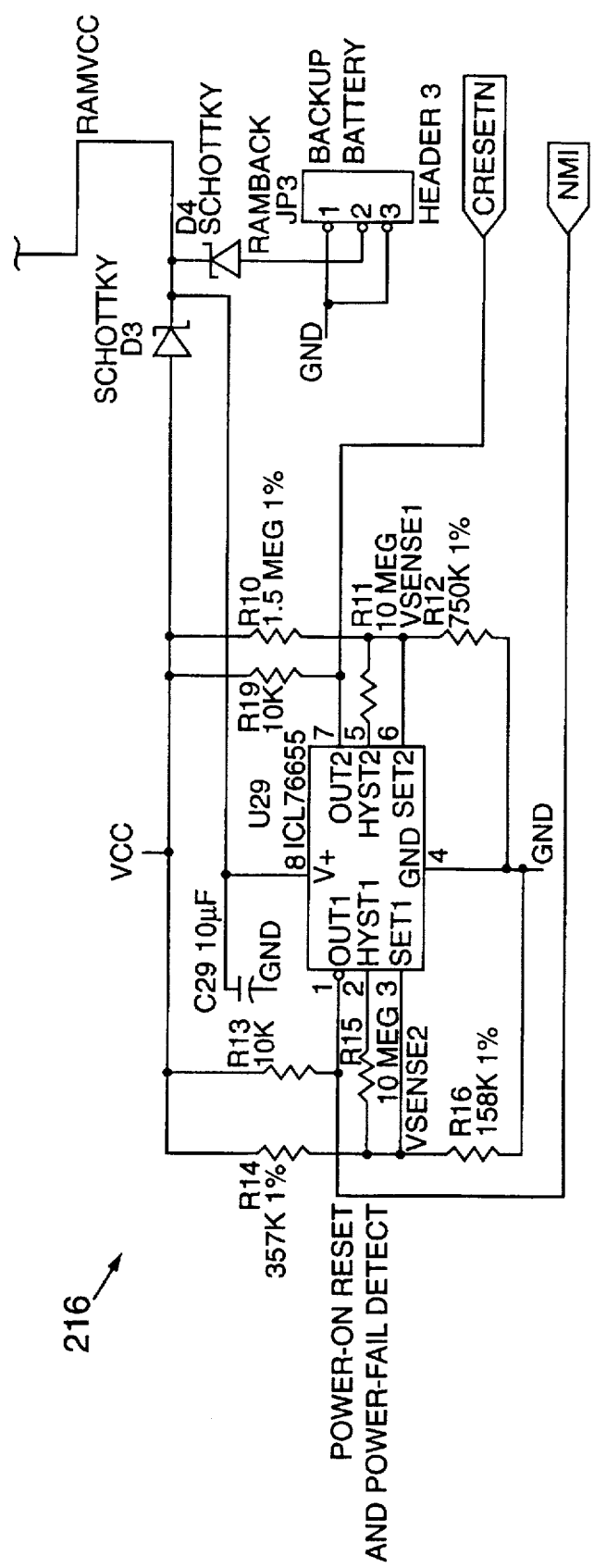

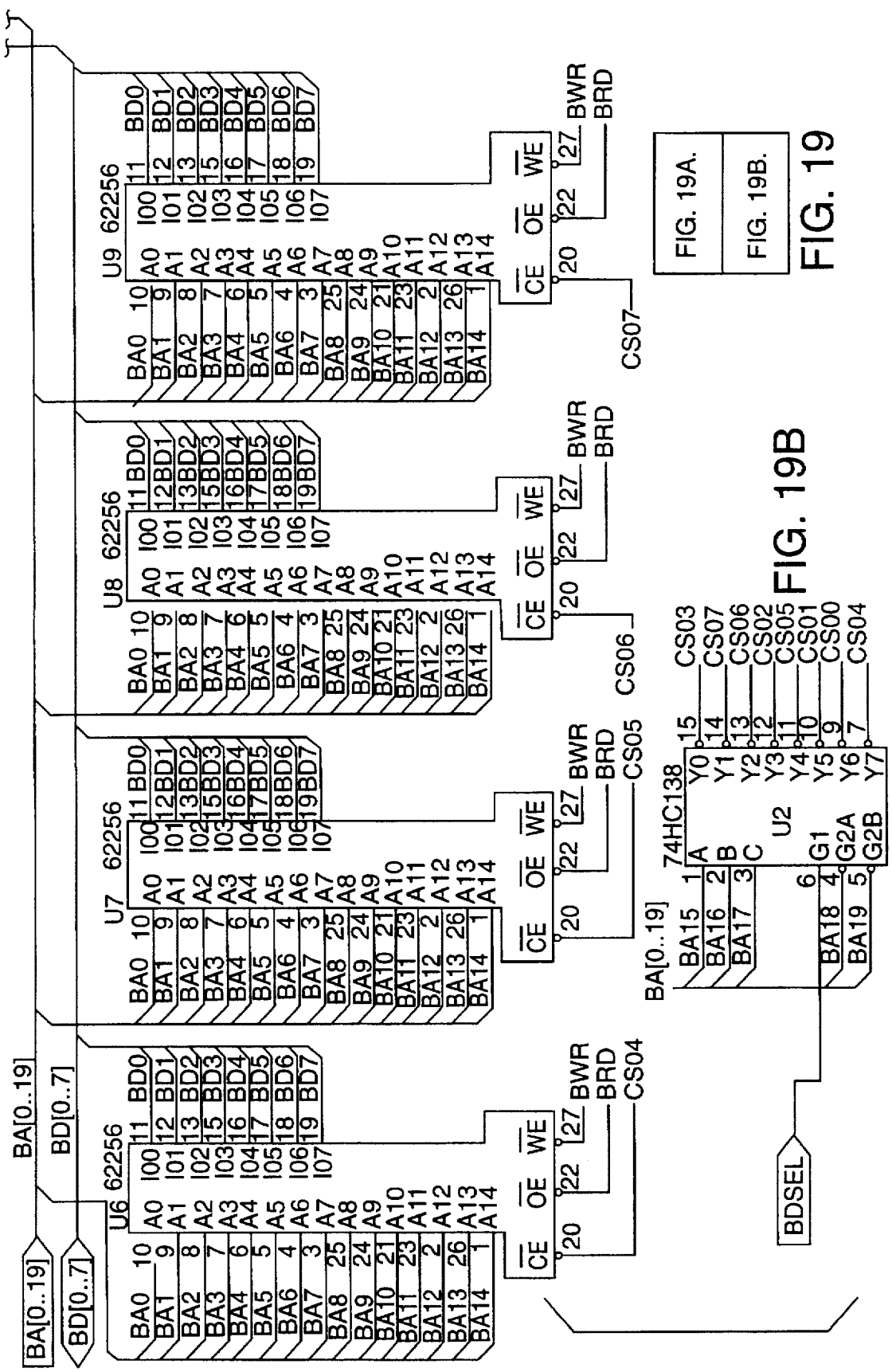

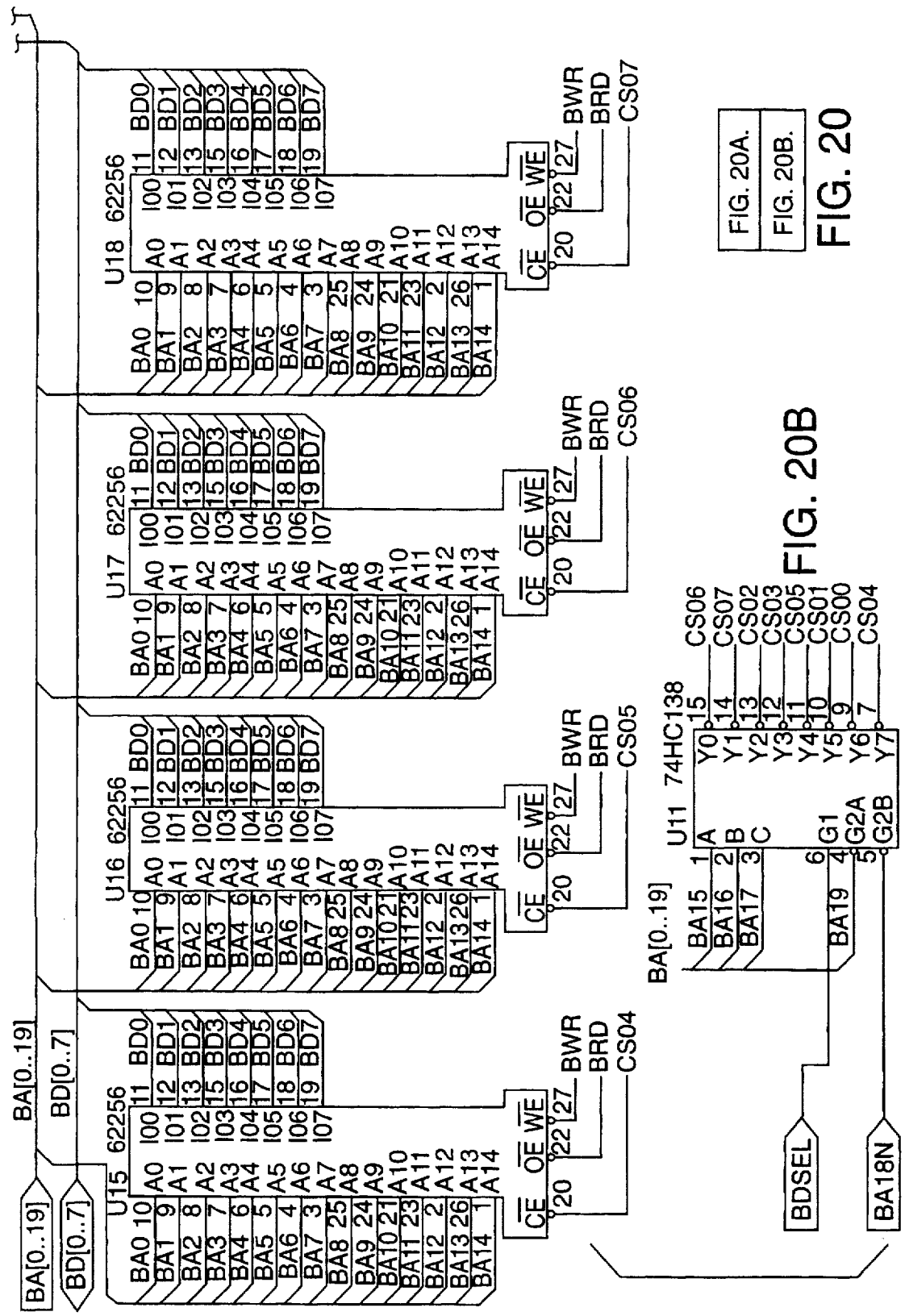

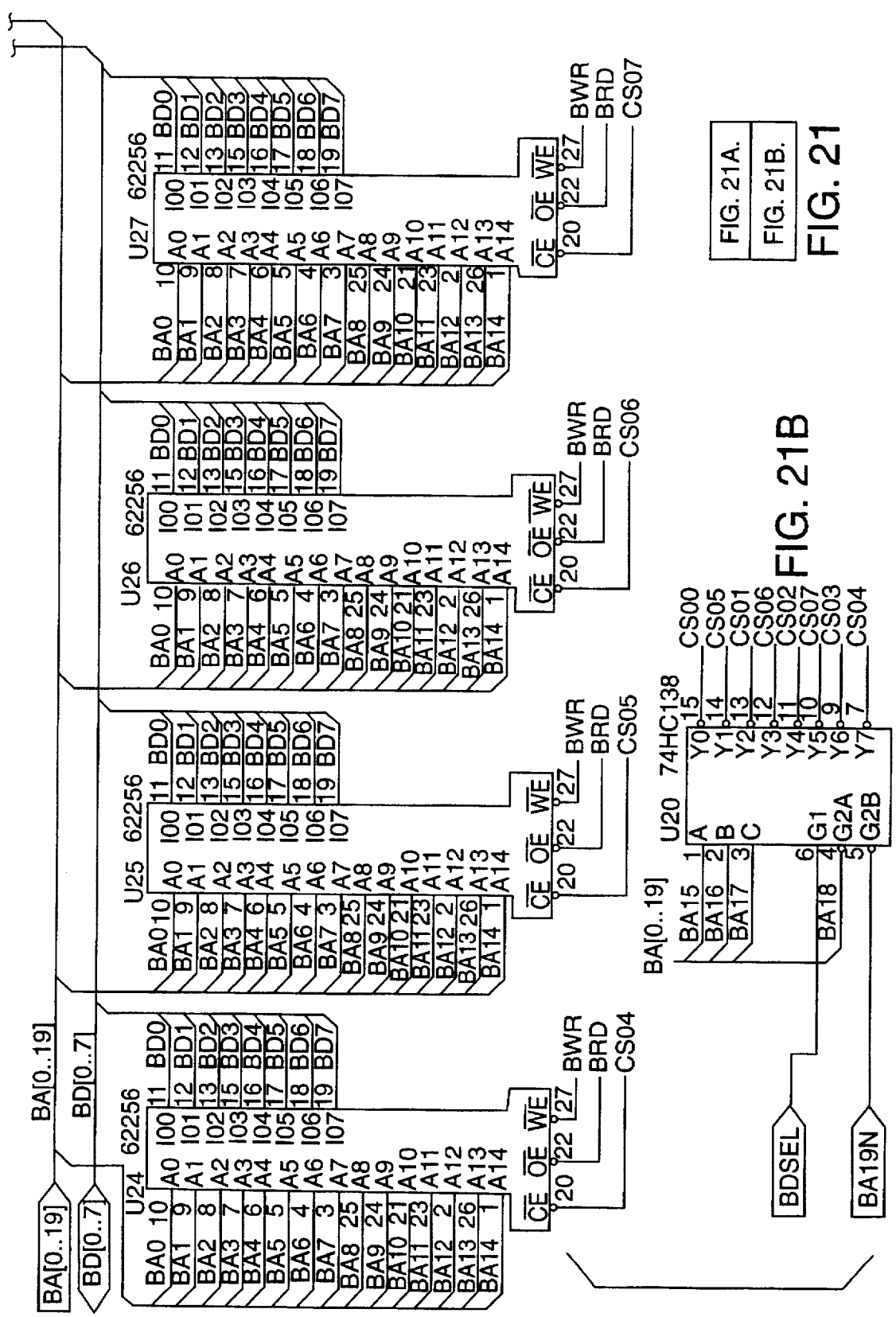

ELECTRONIC TRANSPARENCY METHOD AND APPARATUS

This is a division of application Ser. No. 07/701,446, filed May 15, 1991, now abandoned, which is a division of application Ser. No. 07/233,285, filed Aug. 17, 1988, now U.S. Pat. No. 5,101,197.

Cross reference is made to a microfiche appendix having one microfiche and a total of 77 frames.

FIELD OF THE INVENTION

The present invention relates to electronic transparencies.

BACKGROUND AND SUMMARY OF THE INVENTION

Electronic transparencies are gaining widespread commercial acceptance in applications requiring display of data from a computer to a large number of users. Instead of displaying the data on a convention cathode ray tube monitor, the data is displayed on an LCD panel which is placed on an overhead projector. The light projected through the LCD panel is blocked by its darkened portions, forming a shadow image that is projected just as with conventional film transparencies. Commercially available versions of this product include the Eiki DD-1000, the Sharp QA-25, the nView ViewFrame, the Apollo PC-9000, the Computer Accessories Data Display, the Eastman Kodak DataShow, the Telex Magnabyte I-5120-I and a variety of units marketed by the assignee of the present invention.

While all of these devices have certain advantageous features, they all have several failings. One is that the devices must generally be operated in association with a computer.

It is a principal object of the present invention to provide an electronic transparency that can be operated without an associated computer.

It is another object of the present invention to provide an electronic transparency that can be used by persons who are unfamiliar with computers.

It is a further object of the present invention to permit presentation of computer-generated slide shows without a computer and without a slide projector.

It is still another object of the present invention to provide an electronic transparency with a memory in which a plurality of slide images can be stored.

It is yet another object of the present invention to provide an electronic transparency having the functionality of a stack of conventional film transparencies.

It is still another object of the present invention to remotely control the sequence of slides displayed by an electronic transparency.

It is yet another object of the present invention to permit electronic transparency presentations to be customized to different applications by substituting slides particular to one application with slides particular to a second application.

It is still another object of the present invention to provide an electronic transparency that can operate autonomously to display a sequence of slides.

It is yet another object of the present invention to controllably obscure selected portions of an electronic transparency display.

It is still another object of the present invention to provide an electronic transparency with an interactive user interface.

It is yet another object of the present invention to display a number with each slide in a sequence indicating that slide's position in the sequence.

It is still another object of the present invention to permit the aforesaid number to be displayed at any desired location on the slide.

It is yet another object of the present invention to permit a remotely controlled pointer to be selectably superimposed on a slide displayed by an electronic transparency.

It is still another object of the present invention to permit selected areas of a slide displayed by an electronic transparency to be highlighted.

According to a preferred embodiment of the present invention, an electronic transparency is provided with a memory module into which a plurality of frames of video data ("stock slides") can be captured. The memory module includes a microprocessor which can present predefined sequences of these slides on the transparency's LCD panel automatically. These slide "shows" are defined by the user by selecting from options presented in menu fashion on the LCD panel. The user can specify, for example, the duration that each slide in a sequence is to be shown, the video transition by which it is to be introduced, the degree of "windowshading" with which it is to be displayed, etc. User interface with the menus is achieved through a hand held remote control unit. Once a show is defined, it can be instituted at the press of a button on the remote control unit and can thereafter proceed from screen to screen automatically.

The illustrated transparency also includes a pointer that can be superimposed on the display and controlled by the remote control unit. The pointer can be used to define certain areas of the screen that are to be highlighted by presentation in reverse video form. The memory module can be unplugged from the electronic transparency and transferred to other electronic transparencies as desired. A battery maintains the stock slide images and slide show definition data in memory even after external power is removed.

The foregoing and additional objects, features and advantages of the present invention will be more readily apparent from the following detailed description, which proceeds with reference to the accompanying drawings.

BRIEF DESCRIPTION OF THE DRAWINGS

FIG. 2 is a map schematically illustrating the organization of data in a large random access memory used in a memory module component of the electronic transparency of FIG. 1.

FIG. 3 is a perspective view of the improved electronic transparency of FIG. 1.

FIG. 4 is an exploded view of the electronic transparency of FIG. 3.

FIG. 5 is a perspective view of a memory module used with the electronic transparency of FIG. 1.

FIG. 6 is a view of a hand-held remote control unit used with the electronic transparency of FIG. 1.

FIG. 7 is an exploded view showing a bezel and a back lighting unit that can be used with the electronic transparency of FIG. 1.

DETAILED DESCRIPTION

Figure 1:
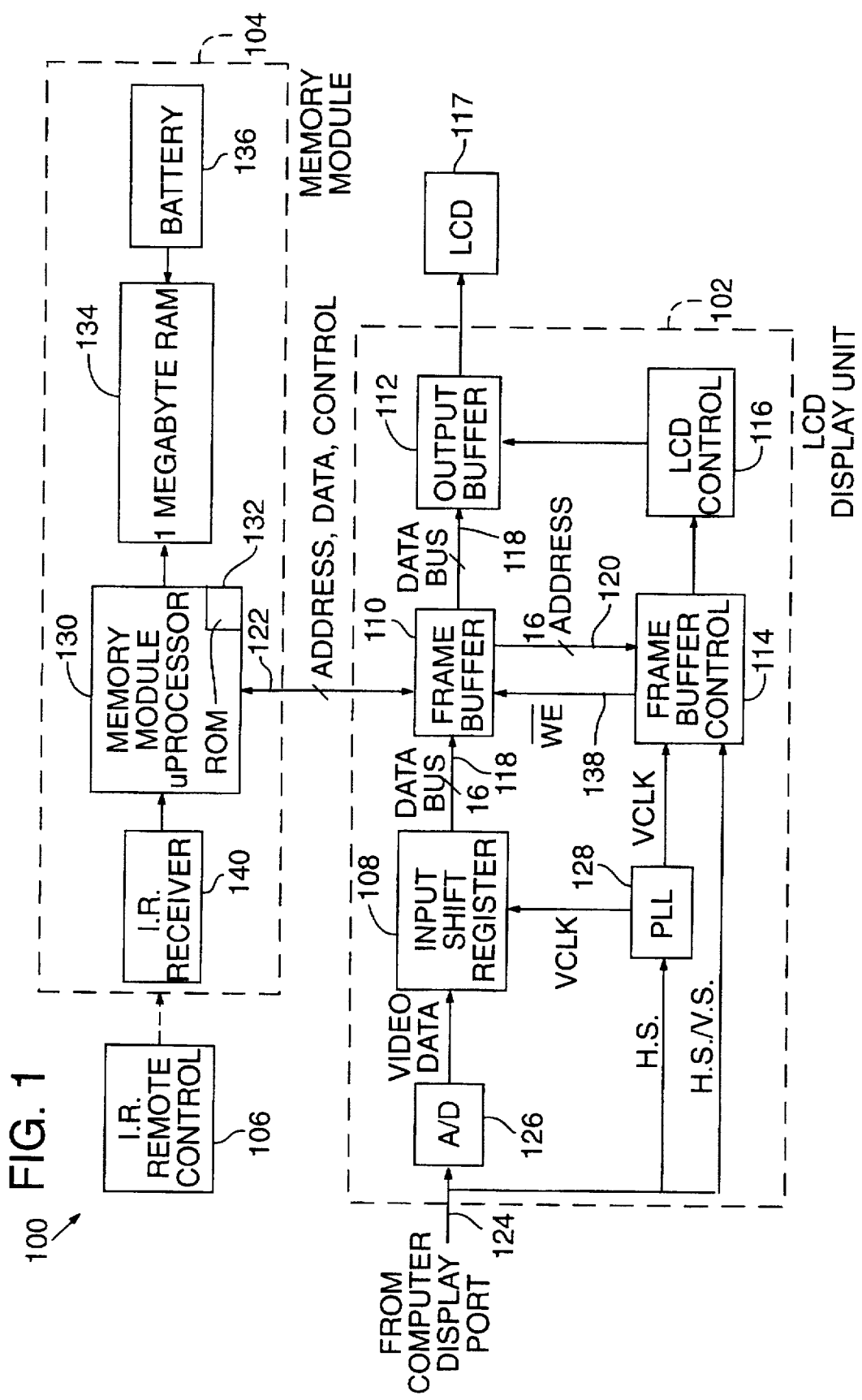
FIG. 1 is a block diagram of an improved electronic transparency according to one embodiment of the present invention.

For expository convenience, the following description first provides a general explanation of the present invention with reference to an illustrative embodiment shown in FIG. 1. The operation of the illustrative embodiment is then described in detail, followed by an explanation of the schematic diagrams (FIGS. 14–22) showing its implementation. The software used in the illustrated system of the present invention is provided as a microfiche appendix.

To aid in understanding of the following description, it is first helpful to standardize the vocabulary. Consequently, the word "show" will be used herein to refer to a collection of slides set up by a user in a desired sequence with desired transitions, durations, etc. Slide shows are "defined" by using the remote control unit in conjunction with pop-down menus displayed on the liquid crystal display. "Slides" refers generically to any computer-generated image, whether "live" from a computer or "captured" into the memory of the memory module. A "stock slide" is a slide that has been captured into the memory module and can thus be included in any of the shows.

FIG. 1—General Description

An illustrative embodiment 100 of the present invention is shown in FIG. 1 and includes three principal components: an LCD display unit 102, a memory module 104 and an infrared remote control unit 106. The LCD display unit 102 is a conventional electronic transparency,(such as the commercially available PC Viewer brand electronic transparency, model PCV-6448C marketed by In Focus Systems, Inc.) that has been modified, as detailed below, to permit operation with the memory module 104. The remote control unit 106 is also of conventional design but is here used in a novel application, namely to program and control operation of an electronic transparency. The memory module 104 is novel and is described fully in the final section of this specification.

In more detail, the electronic transparency 100 comprises a number of components, including an input shift register 108, a frame buffer 110, an output buffer 112, a frame buffer control unit 114, an LCD panel control unit 116 and an LCD panel 117. These components are interconnected by a variety of signal lines, including multiplexed 16-bit data and address busses 118, 120. The busses 118, 120 also are coupled to the memory module 104 through a cable 122.

Video data from a computer is applied to an input port 124 of the LCD display unit 102. This data can be in one of two forms: composite or digital. Composite video is provided on a single line and comprises an analog luminance signal interspersed at regular time intervals with horizontal and vertical sync pulses. Digital video is provided on three separate lines, one for digital luminance data, one for horizontal sync pulses and one for vertical sync pulses. (The digital luminance data for color displays is typically provided on three lines, one for red, one for green and one for blue. These signals are mixed together in the above-referenced In Focus Systems LCD display unit to yield a single luminance signal.) If the illustrated transparency is used with a computer that supplies composite video output (such as an Apple II), the video signal is first processed into digital form by stripping off the vertical and horizontal sync signals and by digitizing the analog luminance signal with the illustrated analog to digital converter 126.

Digital video data from the input circuitry is provided in serial form (one bit per pixel) to the input shift register 108. The shift register 108 groups this data into 16-bit bytes for subsequent storage in the frame buffer 110. The shift register 108 is clocked by a reconstructed video clock signal VCLK that is derived from the horizontal sync signal by a phased lock loop circuit 128. The frequency of VCLK will vary with the video format used by the computer. Typical values are 14.318 megahertz for CGA video, 16.257 megahertz for EGA video and 25.020 megahertz for VGA video. These frequencies correspond to the rates at which individual pixels are provided to the video input 124.

The sixteen parallel outputs of shift register 108 are controllably enabled onto the data bus 118 and are received by the frame buffer 110. Frame buffer 110 accumulates an entire frame of video data, 16 bits at a time, from this data and subsequently forwards it over the bus 118 to the output buffer 112 for display. In most the illustrated embodiment, this frame comprises 480 lines of 640 pixels each, or 307,200 bits of data.

The frame buffer control unit 114 controls operation of the frame buffer 110 and provides the write enable and address signals necessary for the frame buffer to compile a full frame of video data from the signals transmitted on data bus 118. These control signals are derived by the frame buffer control unit 114 from the VCLK signal, the horizontal sync signal and the vertical sync signal. The frame buffer control unit also serves to determine from the vertical and horizontal sync pulses the position of the retrace interval in the video data and disables the acquisition of data by the frame buffer during this blanking interval.

Data acquired by frame buffer 110 is multiplexed back onto the data bus 118 under the control of the frame buffer control unit 114 and is passed to the output buffer 112 for display on the LCD panel 117. (The LCD panel cannot be driven directly from the frame buffer 110 because it must typically be scanned downwardly simultaneously from both its top line and its middle line. Control of this specialized operation is effected by the LCD panel controller 116, which is a dedicated controller designed to cooperate with the frame buffer 110 and the output buffer 112 to provide the video and timing signals necessary to drive the LCD panel 117.)

While the acquisition of video data from the external computer is necessarily done at a rate related to the frequency of the incoming video signal, the transfer of video data out of the frame buffer and through the output buffer is done at a fixed rate unrelated to the type of video signal originally received. The clock signal that controls these latter transfers of video data is derived from a crystal controlled 20 megahertz oscillator.

The above-described circuitry is all conventional and is found in most prior art transparencies. The memory module 104, however, is novel and comprises a control microprocessor 130, a ROM memory 132 for firmware storage, a large RAM memory 134 for data storage, a battery 136 to maintain the RAM memory when external power is interrupted and a variety of support circuitry shown in FIGS. 14–22 and discussed below. The memory module is coupled to the LCD display unit 102 by a multiconductor cable 122. Cable 122 includes address, data, power, clock and control lines linking the microprocessor 130 and other circuitry in the memory module to the corresponding lines in the LCD display unit 102. The particular interconnections are detailed in the discussion of FIGS. 14–22.

The memory module microprocessor 130 controls both the memory module 104 and the LCD display unit 102. Control of the LCD display unit is principally exercised by controlling the frame buffer 110 and the busses and control-lines 118, 120, 138 connected thereto.

In one state of its operation, the memory module microprocessor 130 permits the LCD display unit 102 to operate using a first data path as described above, with video data applied from an external computer being displayed on the LCD panel 117. In a second state, the microprocessor is able to implement a second data path and to write data to and read data from the frame buffer. The first of these capabilities permits the memory module to interrupt display of the video applied from an external computer and allows the LCD panel 117 to display instead video data which the memory module provides from its own RAM memory 134. The second of these capabilities, the ability to read from the frame buffer, permits the memory module to "capture" video supplied by the external computer and to store this data in its memory 134 for later display. (Regardless of which state the memory module microprocessor 130 is in, the frame buffer 110 can always provide video data to the output buffer 112 for display on the LCD panel 117).

In addition to its control over the LCD display unit, the microprocessor 130 also performs the necessary housekeeping functions associated with RAM 134 (such as keeping track of how many slides are stored and which portions of the RAM are free for new data) and is responsible for the extensive user interface screens, discussed below.

While the operation of the illustrated transparency 100 is described in greater detail below, a simplified review of the implementation of a capture operation may aid in a further understanding of the block diagram of FIG. 1.

When the illustrated transparency 100 is connected to an external computer, the video provided by the computer is normally displayed on the LCD panel 117. When an image appears on the LCD panel that the user wishes to capture to the memory 134, the user instructs the unit accordingly by a command signal transmitted from using the remote control 106. When this command signal is received by an infrared receiver 140 on the memory module, the memory module microprocessor 130 issues a signal on cable 122 which disables the input shift register 108. The image on LCD panel 117 is thus momentarily frozen since no new data is provided to the frame buffer. The microprocessor 130 then reads the frame of data currently resident in the frame buffer 110 and places a copy of that data into the RAM memory 134. (The microprocessor 130 first compresses the video data from the frame buffer 110 using a run length limited encoding algorithm before the data is stored in the RAM 134). When the capture is complete, the microprocessor reenables the input shift register 108, permitting it to apply new data to the frame buffer 110.

The large RAM memory 134 in the memory module is used to store both compressed stock slide images and is also used to store data defining the various slide shows into which the stock slide images may be incorporated. This may be better understood by reference to FIG. 2, which is a simplified map of RAM 134.

FIG. 2—Memory Organization

The upper portion of the FIG. 2 memory map shows the storage of individual stock slide images, in this case numbered 1 through 128. The amount of memory required for each slide varies due to the differing degrees of data compression achieved by the compression algorithm on the different slides. The lower portion of FIG. 2 schematically illustrates the show definition data. As described more fully below, this data defines which stock slides are to be displayed and in what order, and includes a variety of presentation attributes defining the particular treatment afforded each slide. (These attributes, discussed more fully below, include the length of time the slide is to be displayed, the type of transition to be used to introduce the slide, the degree of windowshading to be used, etc.) As shown in the lower portion of the figure, show number one is defined to include stock slides 2, 3, 6 and 12. The "⊕" sign after each represents the presentation attributes that are stored for each usage of a stock slide in a show. The data defining show number two is then stored, followed by the data for all other shows currently defined in the memory module.

(It will be recognized that the slide show definition data in the RAM memory 134 occupies much less space than the stock slide data and is thus not represented to scale in FIG. 2.)

FIGS. 3–5—Physical Construction

FIGS. 3–5 show the physical cooperation of the memory module 104 and the LCD display unit 102. The memory module is physically constructed to be removable from the display unit so that it can be taken off and stored for later use or transferred and used with another display unit. (The battery 136 used in the memory module is sufficient to retain the video information for many years.) The memory module 104 includes a multipin connector 142 which cooperatively mates with a corresponding connector on the housing 144 of the LCD display unit to effect coupling of the cable 122 between the memory module and the display unit. (Connector 142 can also be used to couple the memory module to another computer. This capability is useful for downloading the contents of the memory module into an auxiliary computer for subsequent transfer into a second memory module, so as to effect duplication of memory modules.) Protruding members 146 and 148 on the memory module 104 engage corresponding slots 150, 152 in the LCD display unit housing 144 to securely latch the memory module to the LCD display unit.

An infrared detector 154 used as a component of the infrared receiver 140 is mounted on the front of the memory module and is oriented towards the overhead projector screen with which the transparency is used. Infrared control signals can be directed to the photodetector 154 by pointing the remote control unit 106 towards the screen and reflecting the signals off the screen and back to the photodetector. This positioning of the photodetector greatly enhances the utility of the remote control unit since the remote control need not have a line-of-sight path to the photodetector in order to communicate.

Included on the side of the LCD display unit 102 are a connector 156 for digital video input, a connector 158 for composite video input and a connector 160 for a five-volt DC power source. On the top of the display unit are buttons 162 used to increase and decrease contrast, deselect certain colors, reposition the image in the liquid crystal display, reverse the video, etc.

VIDEO DISPLAY

While operation of the transparency 100 has been illustrated with reference to video frames comprised of 480 lines of 640 pixels each, the transparency is compatible with other video formats. Video frames in the EGA format, for example, comprise 350 lines of 640 pixels each. If data in EGA format is provided to the transparency, the bottom 130 lines of data in the frame buffer 110 (which is organized into 480 by 640 format) are stored as all zeros. If desired, the EGA image can be centered in the LCD panel by using position controls 162 on the LCD display unit 102.

Some video formats have less than 640 pixels per line. In such cases, the shortened lines are stored in the 480 by 640 pixel frame buffer 110 with leading and trailing data zeros sufficient to center the data lines on the LCD panel 117 when displayed.

While the illustrated transparency 100 advantageously zero-fills at the periphery of the video frame to permit accommodation of differing video formats, the technique has a drawback: Light from the overhead projector with which the transparency is used can pass through the unused peripheral portion of the LCD panel to the projection screen. This unnecessary light on the screen lightens the room in which the transparency is used and makes it more difficult for the audience to discern the desired portion of the screen.

To eliminate this drawback, a bezel 164 (FIG. 7) is provided that can be placed on the LCD panel 117 to mask out unused peripheral portions of the display and thus block unnecessary light from the projector. Different bezels are provided for different video formats. The bezel for the EGA format, for example, blocks the top and bottom 65 lines of the LCD panel 117 (assuming the image is centered in the LCD panel 117). The bezel for the Macintosh format blocks lines at the top and bottom and also blocks a number of pixels on each side. If desired, a bezel can be constructed with movable members to tailor the masking effect to the particular slide being displayed.

Unlike other electronic transparencies, the present invention is often operated by the user in advance of the presentation to define the show(s) to be presented. Consequently, it has been found desirable to provide a small viewing screen 166 (FIG. 7) that can be snapped behind the LCD panel 117 to permit the user to read the menus on the LCD panel without use of an overhead projector. In one embodiment, this snap-in screen 166 is made of a highly reflective white material. The user thus relies on ambient light incident on the top of panel 117 to make the menus and other screen displays visible. In another embodiment, the snap-in screen 166 is back lit so as to present illumination under the panel by which the user can more readily read the data displayed thereon.

Up to 150 stock slides can be stored in the illustrated transparency 100, depending on the content of each slide. Since the data comprising each slide is compressed prior to storing, each slide generally takes up much less than a full screen's worth of storage space. Up to ten shows can be defined from the stock slides in the illustrated embodiment and the 150 (or fewer) stock slide images can be used an aggregate of 500 times over all the shows.

A slide can be used more than once in a given show. For example, a slide with a company logo can appear at the beginning and end of a show. The logo is stored only once, occupying only one of the 150 possible stock slide images. Each time it is used, one of the 500 possible usages is taken.

An analogy may be made between the present invention and a conventional slide projector with slide trays. The present invention provides ten "trays" (shows). Unlike a slide projector, however, the trays are of variable length. Each tray can have any number of slots for slides, as long as the total number of slots in all trays does not exceed 500. Also, unlike a slide projector, the user can create as many copies of a given slide instantly and place them in any slots in any shows desired.

REMOTE CONTROL UNIT

The remote control unit 106 used with the illustrated transparency is a standard infrared remote control purchased from Zenith (part number 124-138-08) with a face plate (FIG. 6) tailored to the functions here involved.

In the upper left portion of the remote control are eight cursor arrow keys surrounding the center CURSOR key. Four of these keys are used in editing to select new functions. They are the UP, DOWN, LEFT and RIGHT keys 168, 170, 172, 174. The ENTER key is used to go to the next menu level, if there is one, or to carry out the selected function. The ESCAPE key is used to abandon or "back out" of a function, or go back to the previous menu. The WINDOW UP and WINDOW DOWN keys 176, 178 are used to set windowshade positions for individual slides or entire shows during editing.

The NEXT and PREVIOUS keys 180, 182 are used during presentations to select the next or previous slides in a sequence.

During the actual presentation of a slide show, the center CURSOR key 184 is used to turn on or off an on-screen pointer, as described more fully below. The direction keys around it are used to position the pointer. The ENTER key 186 is used to control highlighting. The ESCAPE key 188 is used to interrupt a presentation and permits a user to skip directly to a different slide in the same show, go live to the computer input, or stop a show and go back to edit or present a different show.

The VIDEO +/− and LIGHTEN and DARKEN keys 190, 192, 194 on the remote control have counterparts on the LCD display unit 102. The LIGHTEN and DARKEN keys 192, 194 always have the same effect regardless of what function the transparency is performing. The VIDEO +/− key 190 operates to reverse the screen video, but operates only when an image is being displayed. At other times (such as when editing menus are on the screen) the VIDEO +/− key has no effect.

All keys on the remote control unit 106 "auto repeat." That is, if held down, they repeat their functions at about five times per second. The eight cursor arrow keys and the WINDOW UP/DOWN keys "accelerate." That is, they repeat at a faster rate if they are held down continuously.

OPERATION

Figure 8:
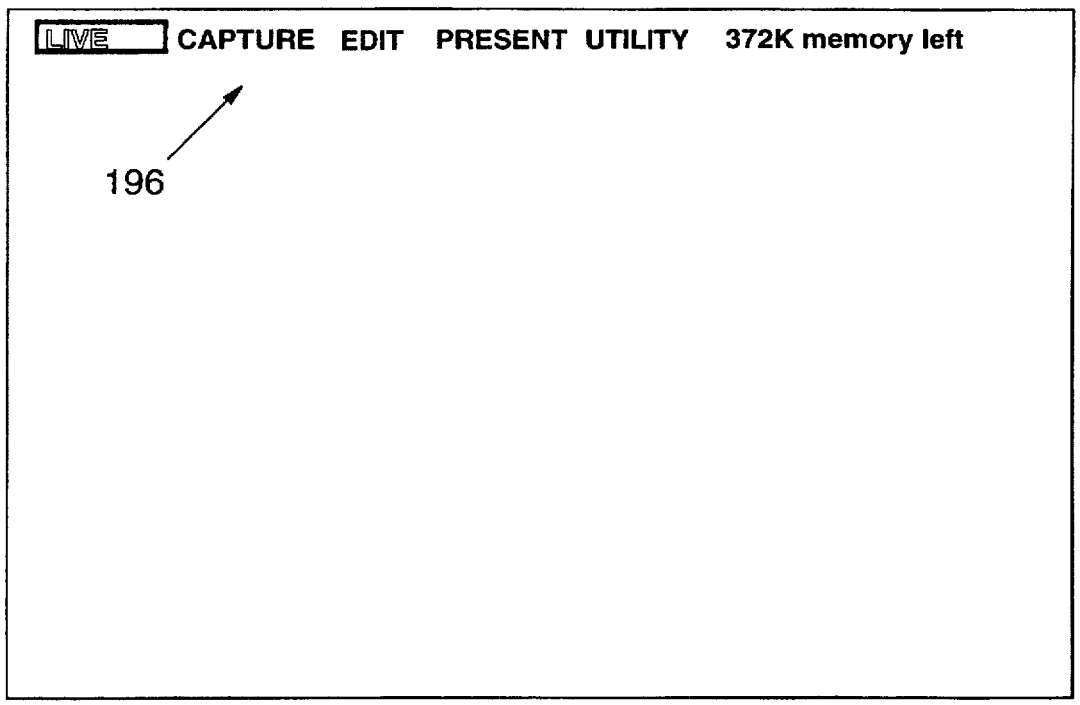
FIG. 8 is a screen display created by the electronic transparency of FIG. 1 when it is first powered.

When the illustrated transparency 100 is first powered, a boot-up screen is displayed identifying the manufacturer of the device and the software version. The transparency's main menu 196 (FIG. 8) is displayed horizontally across the top of the screen and presents five options, any one of which can be selected by operation of the remote control unit 106. These options are LIVE, EDIT, PRESENT and UTILITY and are discussed in detail below.

To the right of the main menu 298 is a display of the amount of memory currently available in RAM 134. As new stock slide images are captured, the number decreases. When existing stock slide images are deleted, the number increases. When the RAM memory 134 is completely empty, between 750 and 800 kilobytes are available. Each slide image takes from one to thirty-eight kilobytes of memory, depending on how much compression can be achieved.

To select among the functions displayed on the main menu 196, the user operates the LEFT and RIGHT cursor arrow keys 172, 174. The selected function is shown in reverse video. To perform the specified function, or to go to the next menu level, the user presses the ENTER key 186. All of the menus beyond the main menu are arranged vertically, so the UP and DOWN keys 168, 170 are used for function selection.

The five functions selectable from the main menu 196, and the various options associated with these functions, are discussed below.

1. LIVE

The LIVE function is used to display data provided to the transparency 100 from a computer connected to the video input port 124. When selected, the main menu disappears from the top of the display 117 and the invention operates much like any other passive electronic transparency.

2. CAPTURE

The CAPTURE function is used to store frames of video data as stock slides in the RAM memory 134 of the memory module 104. When selected, a message "Hit ENTER to go live, then hit ENTER to capture" is displayed on the LCD display unit 102. The first time the user presses the ENTER key 186, the menu and prompt disappear and control of the LCD display unit is turned over to the external signal source, just as in the "LIVE" function above. The user then operates the computer to display an image that is desired to be captured. The next time the user presses the ENTER key, the image then being displayed is captured and is stored in the memory module RAM memory 134. A message "Slide assigned image #NNN, hit ENTER to continue" appears on the display. (NNN depends on the number of slides already stored in the memory). If no data is being supplied to the input port 124 when the capture is attempted, an error message is presented saying "No data to capture, hit a key to continue."

The user can abandon the CAPTURE function prior to capturing an image by pressing the ESCAPE key 188. If the user makes a mistake and stores a slide that is not desired, the UTILITY function (described later) can be invoked to delete it.

The first time slides are captured, they are assigned consecutive numbers: 1, 2, 3 etc. If certain of these stock slides are thereafter deleted, their numbers will be reused during subsequent capture operations. For example, if slides 1–10 are captured and slides 2, 4, 6 and 8 are subsequently deleted, the next slide captured will be assigned number 2, then number 4, and so on.

Slide images are captured exactly as they are displayed on the LCD panel 117 the instant the ENTER key is pressed. Consequently, if it is desired to save the slide in reverse video form, the VIDEO +/− key 190 must be pressed before the slide is captured. Similarly the SYNC, COLOR SELECT and LEFT/RIGHT position adjustments on the LCD unit 102 should be used before capturing images since these controls cannot be used to alter the stored version of the image in the memory module.

It is desirable to capture slides in the same order they are to appear in a show, if possible. This makes editing of the show easier, as will become apparent from subsequent discussions.

By noting the "MEMORY AVAILABLE" values displayed on the LCD screen 117 before and after a slide is captured, a user can determine the amount of memory that a slide requires in the memory module 104.

3. EDIT

Once a group of slides has been captured, the EDIT function is used to arrange them into a show. When EDIT mode is selected, a menu 198 (FIG. 9) of editing functions appears: CHANGE SHOW, COPY SHOW, DELETE SHOW and COLLECT NEW. The desired one of these functions is selected by moving the reverse video highlighting bar to the desired choice with the UP and DOWN cursor arrow keys 168, 170 and then pressing the ENTER key 186. The four editing functions, and their respective options, are discussed below.

3.a. EDIT/CHANGE SHOW

The CHANGE SHOW function permits a user to edit an existing show. Stock slides can be added, deleted or rearranged and the presentation attributes can be changed for each slide in the show.

When CHANGE SHOW is selected, a menu 200 (FIG. 9) of existing shows is windowed over the basic EDIT menu 198. The show that is desired to be edited is selected by operating the UP and DOWN cursor arrow keys 168, 170 and the ENTER key 186 is pressed to finalize the selection.

Figure 9:
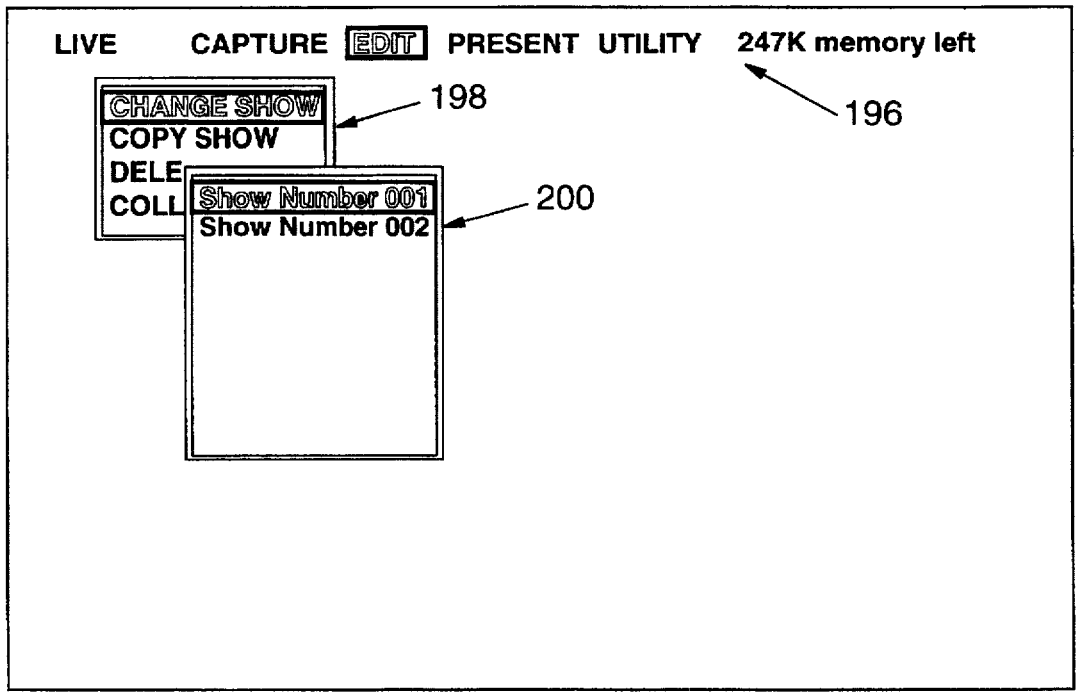
FIG. 9 is a screen display created by the electronic transparency of FIG. 1 showing first and second menus of the EDIT function.

After the show to be edited has been selected from the menu 200 of FIG. 9, a window having a "slide show definition chart" 202 (FIG. 10) appears with a tabular listing describing the show. The chart is organized into five columns: SEQUENCE NUMBER, STOCK SLIDE NUMBER, DISSOLVE TYPE, WINDOWSHADE % and DELAY. Each slide included in the show is listed. The SEQUENCE NUMBER identifies a slide's position in the sequence of slides comprising the show. The STOCK SLIDE NUMBER identifies the number for the slide in the RAM memory collection of stock slides. The DISSOLVE TYPE specifies the type of transition by which the slide is to be introduced. (Exemplary dissolve types supported by the disclosed embodiment are a diagonal dissolve, a left to right dissolve, a center out dissolve, a random dissolve and a simple replace.)

The WINDOWSHADE column specifies the percentage of the slide image that is to be occluded by a windowshade.

Windowshade is a video construct used by the present invention to cover up part of a slide. The user can move the windowshade during a presentation by use of WINDOW UP and WINDOW DOWN keys 176, 178. The windowshade can either be "white" (letting light through) or "black" (blocking light). In either case, it is "opaque" in the sense that it blocks out the image from the slide below it. Windowshade values of one to 100 percent are permitted, with 100 percent being no windowshade.

Finally, the DELAY column specifies the duration in seconds that the slide is to be displayed before the show progresses automatically to the next slide. In the illustrated embodiment, the delay can be set to between 1 and 99 seconds or can be specified as "manual." In this case, the slide does not leave the screen until the ENTER key 186 or the NEXT key 180 is operated. (In alternative embodiments, delays of fractions of seconds can be specified so as to effect an animation sequence.)

To change any of these presentation attributes for a slide in the show being edited, the slide's listing in the slide show definition chart 202 is highlighted by moving the reverse video highlighting bar using the UP and DOWN cursor keys 168, 170. (If there are more slides in a show than can fit in the chart 202, the UP and DOWN cursor keys 168, 170 will cause the chart to scroll within the window until the desired slide is found.) The ENTER key 186 is then pressed to obtain a menu 204 (FIG. 10) of change options: PREVIEW, ADD, DELETE, CHANGE WINDOWSHADE, CHANGE DELAY and CHANGE DISSOLVE. These options are discussed below.

3.1.(i) EDIT/CHANGE SHOW/PREVIEW

Figure 10:
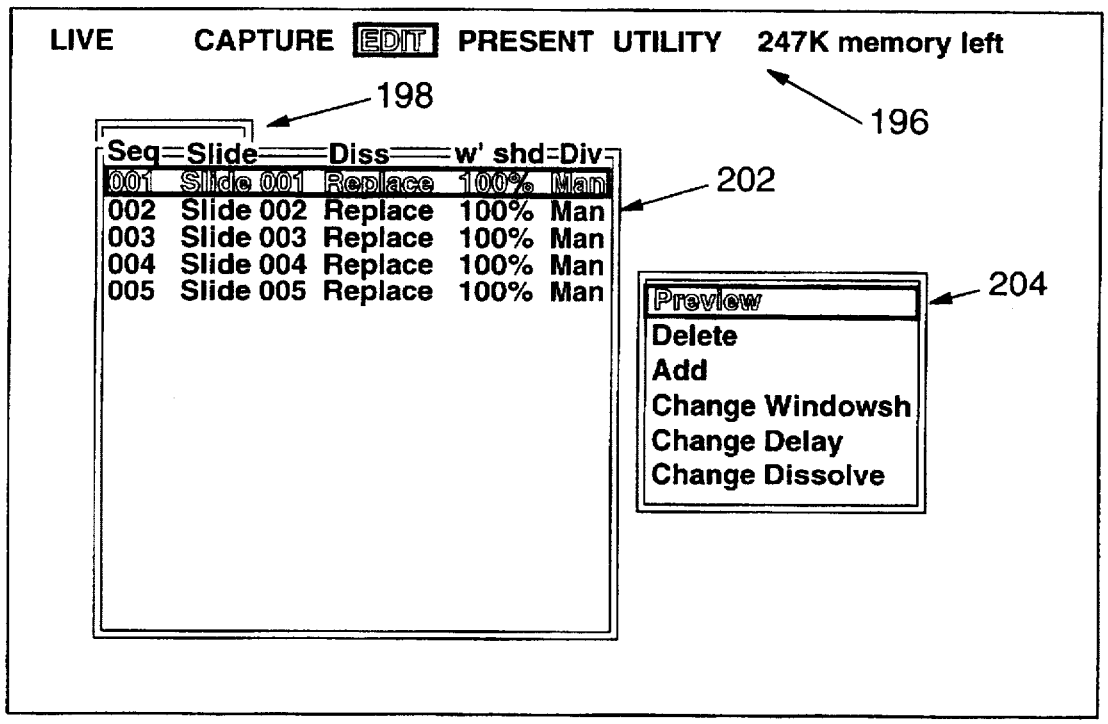
FIG. 10 is a screen display created by the electronic transparency of FIG. 1 showing third and fourth menus of the EDIT function.

If the PREVIEW option is selected from the menu 204 of FIG. 10, the menus 202, 204, etc. disappear and the LCD panel 117 displays a full image of the selected slide. To return to the change options menu 204, the user presses any key. (A slide can be previewed with windowshading by using the WINDOWSHADE option in the UTILITY function, discussed below).

3.a.(ii) EDIT/CHANGE SHOW/DELETE

The DELETE function is the second option in the change options menu 204 and is used to remove a slide usage from a show. (The stock slide data, however, stays in the RAM memory 134. All that is deleted is the reference to that stock slide in the definition of the specified show). If the user selects the DELETE function, a message appears asking the user to confirm the deletion of the slide with the UP cursor key 168. Pressing the UP key performs the deletion. Pressing any other key abandons the deletion and leaves the slide in the show.

3.a.(iii) EDIT/CHANGE SHOW/ADD

Figure 11:
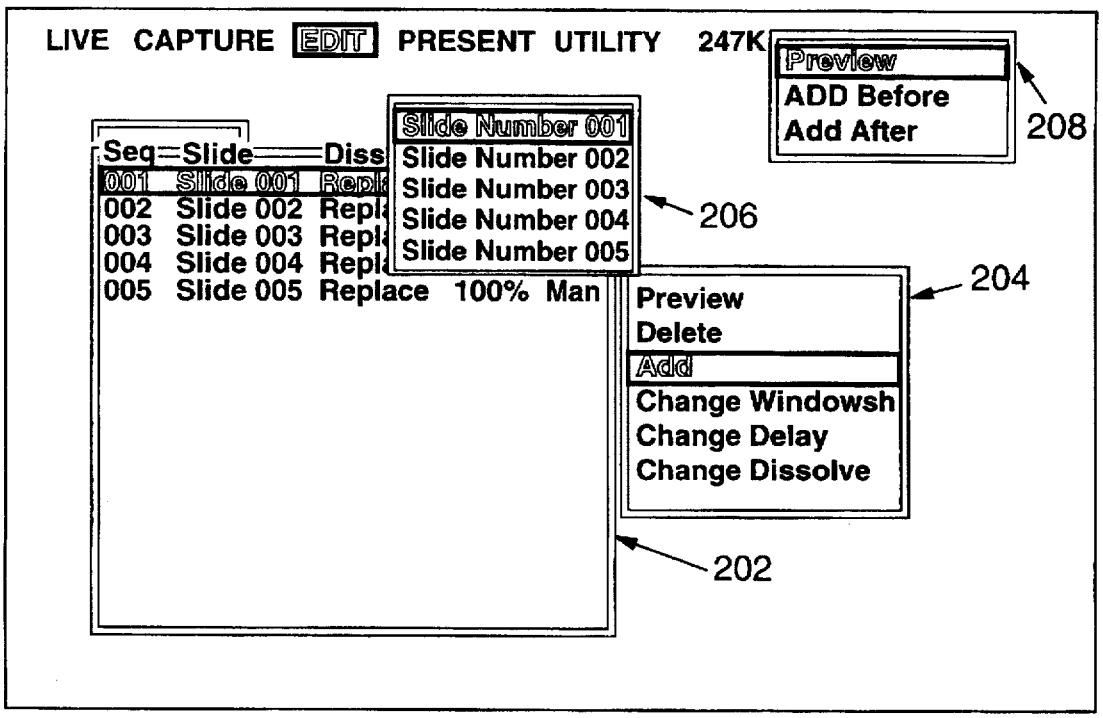
FIG. 11 is a screen display created by the electronic transparency of FIG. 1 showing fifth and sixth menus of the EDIT function.

The ADD function brings up a menu 206 (FIG. 11) of all stock slides currently stored in the memory module RAM 134, from which one may be selected for use in the show being edited. The UP and DOWN keys on the remote control are used to select the stock slide to be added (the stock slide list 206 scrolls within its window if necessary) and the ENTER key is pressed to designate the selected slide. Another menu 208 then appears (also shown in FIG. 11) with the options PREVIEW, ADD BEFORE and ADD AFTER.

The PREVIEW option permits a user to preview the slide that is to be inserted. If PREVIEW reveals an unexpected slide, the user can press ESCAPE to return to the stock slide selection menu 206 to select a different slide.

When the user has found the desired slide, the ADD AFTER or ADD BEFORE option is then selected by moving the highlighting bar to the desired operation and pressing the ENTER key. These operations create a new reference to the selected stock slide after or before the slide highlighted in the slide show definition chart 202.

When a stock slide is ADDed into a show, it is assigned the current default windowshade, dissolve type and delay time, discussed below.

3.a.(iv) EDIT/CHANGE SHOW/CHANGE WINDOWSHADE

The fourth option in the change options menu 204 is CHANGE WINDOWSHADE. If a user selects this function, the slide highlighted in the slide show definition chart 202 is displayed with its current windowshade placement. The user then operates the WINDOW UP/DOWN keys 176, 178 to place the windowshade at a desired location and presses ENTER to change the slide show definition chart to reflect the newly set windowshade value.

This CHANGE WINDOWSHADE option can be used to preview a slide with its specified windowshade placement. The user simply selects the CHANGE WINDOWSHADE function to view the windowshaded slide and then presses ESCAPE to leave the windowshade unchanged.

If desired, the windowshade can be moved automatically during a presentation by referencing the same stock slide several times in the definition of the show, each with a different windowshade setting. As the slides transition during the presentation, the windowshade appears to move up or down.

3.a.(v) EDIT/CHANGE SHOW/CHANGE DELAY

If the user selects the CHANGE DELAY function, a window appears displaying the current delay and inviting the user to press the UP key to increase the delay (up to 99 seconds) or to press the DOWN key to decrease it (the value below 1 is MAN for MANUAL). Once the desired value has been reached, the user presses ENTER to effect the change. The change is immediately reflected in the slide show definition chart 202. It is possible to have slides with numeric delays intermixed with slides with "manual" delays to have the show display a series of slides automatically and then have the show stop at a desired point for further manual control.

Note: If the last slide used in a show is specified to have a numeric delay, then after the last slide has been displayed for the specified time, the show will restart automatically at its beginning.

3.a.(vi) EDIT/CHANGE SHOW/CHANGE DISSOLVE

Figure 12:
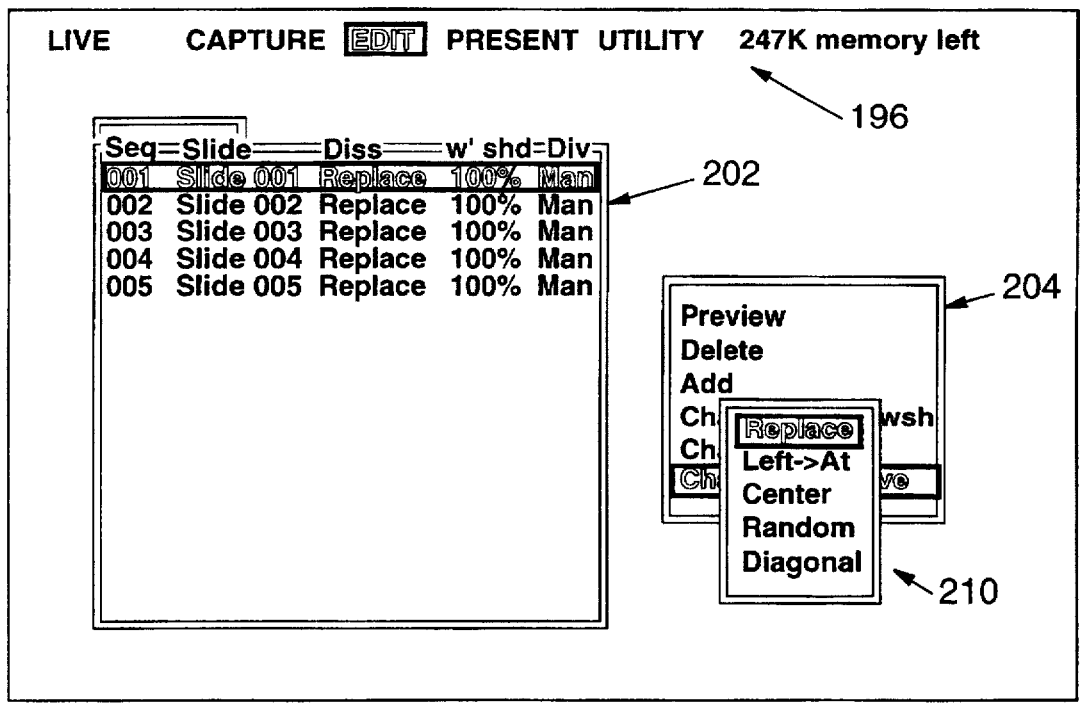
FIG. 12 is a screen display created by the electronic transparency of FIG. 1 showing a different fifth menu of the EDIT function.

If the CHANGE DISSOLVE function is selected, a menu 210 of available dissolve types appears. This menu is shown in FIG. 12 and includes REPLACE, LEFT-RIGHT, CENTER, RANDOM and DIAGONAL. The user can operate the UP and DOWN keys to select the desired dissolve type and press the ENTER key to effect the change. (During a presentation, the time it takes the system to perform the DISSOLVE is added to the specified DELAY time (if any) so that each slide is displayed in its static state for the full DELAY interval, regardless of the type of transition used).

After the appropriate windowshade, delay and dissolve changes have been made to the selected slide, the user can backtrack to the slide show definition chart 202 by pressing the ESCAPE key. The user can then reposition the highlighting bar to a different slide in the chart so that the parameters of other slides in the show can be edited.

After all of the slides in a show have been edited as desired, the ESCAPE key can be pressed once again, returning the user to the menu 200 of FIG. 9 which lists all of the shows defined in the memory module. The above-described operations can be repeated, if desired, to edit the definition charts of other slide shows. If no other slide shows needs editing, the user can press ESCAPE one more time to return to the basic menu 198 of EDIT functions.

3.b. EDIT/COPY SHOW

The second of the basic EDIT functions, COPY SHOW, is used to create an identical copy of a specified show. That is, a new show is created, all of whose slide usages are identical to the original. Windowshade settings, delays and dissolve types are all copied. The COPY SHOW function is used for creating several shows that are largely the same but which need to be individually tailored to different audiences.

If the COPY SHOW function is selected, the menu 200 of existing shows is presented. The user selects the show to be copied and presses ENTER. A new show identical to the specified show is created and is assigned the next available show number. The user can then use the CHANGE SHOW function as described above to tailor the new show as desired.

3.c. EDIT/DELETE SHOW

The third of the basic EDIT functions, DELETE SHOW, is used to remove all of a show's definition data from the memory module. If this function is selected, the menu 200 of existing shows is displayed. The user selects the show desired to be deleted and presses the ENTER key. A message appears requesting the user to confirm the DELETE SHOW action by pressing the UP key 168. If confirmed, the data defining the selected show is deleted. (However, the stock slides that were included in the show are not deleted.) Pressing any other key abandons the DELETE operation and leaves the selected show intact.

3.d. EDIT/COLLECT SHOW

The fourth and final of the basic EDIT functions, COLLECT SHOW, is used to compile a show from stock slides that have not been incorporated into any earlier defined shows. This feature, too, is used as a shortcut in defining shows and is used most often after capturing a series of new slide images. Slides are inserted into the new show in order by stock slide number. (The stock slide numbers may or may not correspond to the order in which the slides were captured, depending on the memory requirements of each slide, other deletions and other captures that may have been made).

The slides to be used in a show are typically captured seriatim from a computer. However, to enter each of these slides into the show using the ADD function (discussed above) requires that each slide be specified and added individually. The COLLECT function automates this collection process. That is, to create a number of shows, each with different slide images, the sequence in general is:

1. CAPTURE the desired images; and
2. Use the COLLECT SHOW function to place them into a show.

These steps are repeated for each of the shows to be defined.

If there are no stock slides in the memory from which such a show can be defined, the system displays an error message: "No unused slides to collect, hit a key to continue."

This concludes all of the options in the EDIT function of the illustrated transparency 100.

4. PRESENT

Figure 13:
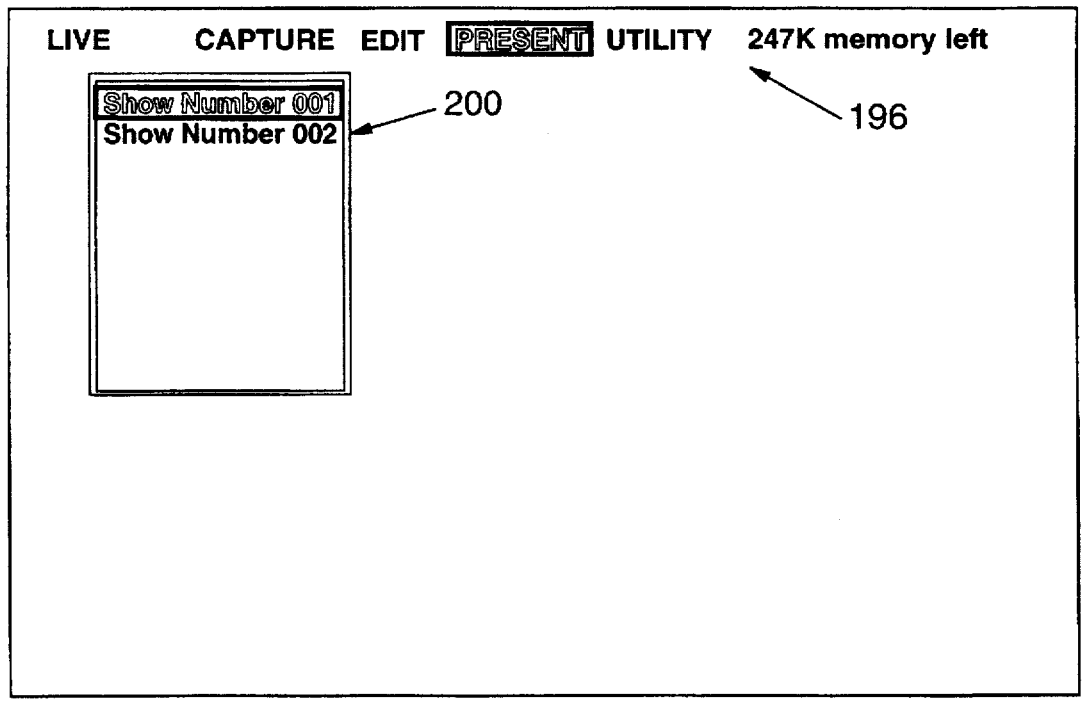
FIG. 13 is a screen display created by the electronic transparency of FIG. 1 showing a first menu of the PRESENT function.

The fourth option on the main menu 196 is PRESENT. If PRESENT is selected, the menu 200 (FIG. 13) of all the shows defined in memory is displayed. The user moves the highlighting bar to the desired show and presses ENTER. The transparency then begins it autonomous operation, displaying the first slide specified in the show with its windowshade (if any) and transitioning from it to subsequent slides using the earlier-specified transitions. When the presentation reaches a slide with a delay of "manual," the presentation pauses until the NEXT key 180 on the remote control is pressed.

If a delay time other than MANUAL was specified for the current slide, the next slide will be displayed as soon as the delay time elapses, or when the NEXT key 180 is hit, whichever occurs first. The PREVIOUS key 182 can be used to go back one or more slides as desired. If a user backs up to a slide with a delay time, after the delay time has elapsed, the next slide will be displayed and the show will resume in the forward direction.

The user can operate the WINDOW UP/DOWN keys 176, 178 to move the windowshade during autonomous presentation of a show even if no windowshade has been specified for a slide (i.e. 100 percent).

In many electronic transparency applications, it is desirable to point to certain features on the displayed image. The illustrated transparency permits such a pointer to be superimposed over the displayed image on the LCD panel 117. (In the preferred embodiment, the pointer takes the form of an arrow, although other shapes, such as cross-hairs, could readily be used.) The pointer is toggled on and off by pressing the center CURSOR key 184 on the remote control. When present on the display, the pointer can be moved in any direction by using the cursor arrow keys.

The present invention also permits certain areas of the display to be highlighted by display in reverse video form. This is effected by activating the pointer and pointing it to one corner of the area to be highlighted. The ENTER key 186 is then pressed to "anchor" that corner of the highlighting. As the pointer is thereafter moved, a highlighting rectangle appears, with one corner at the initial "anchor" point and its opposite corner at the current point of the pointer. To leave the highlighting definition mode, the user presses ENTER key again, or can hit the center CURSOR key 184 twice. This returns the pointer to its usual pointing function. To remove the highlighting from the screen, before hitting ENTER a second time, the user moves the pointer so that the highlighted rectangle collapses into a single point, and then presses ENTER to free the pointer.

Highlighting is temporary in the illustrated embodiment. The next time the particular slide is projected in any show, no highlighted area is displayed until the pointer/highlighting function is used to create it.

To interrupt a show being presented, the user can press the ESCAPE key. A menu of options appears: LIVE, STOP and GOTO. The user can select one of these options or can press the ESCAPE key to return to the show in progress.

4.a. PRESENT/LIVE

The LIVE option suspends the presentation currently in progress and turns control of the display to a computer connected to the external input port 124. Pressing any key in this PRESENT/LIVE mode returns the unit to the LIVE/GOTO/STOP menu.

4.b. PRESENT/STOP

The STOP option stops the show currently in progress and returns to the main menu 196. This function can be used to go to a different show or to perform capture or editing operations.

4.c. PRESENT/GOTO

The GOTO option is used to skip from the present slide to a different slide within the present show. When this function is invoked, the slide show definition chart 202 appears from which the user can select a desired next slide. When ENTER is next pressed, the slide show begins from the selected slide.

5. UTILITY

The fifth and final of the options available on the main menu 196 is UTILITY. The UTILITY menu has four options: USAGE, ORPHANS, DEFAULTS, and ERASE.

5.a. UTILITY/USAGE

The USAGE function allows the user to determine into which shows a specified stock slide image has been incorporated. Selecting this function brings up a small window through which a list of all stock slides stored in memory can scroll. The user highlights the number of the stock slide of interest and presses ENTER to obtain a listing of all slide shows into which that slide has been incorporated. If a slide is used more than once in a show, an asterisk appears next to the show number. If a slide is not used in any shows, the word "None" appears.

5.b. UTILITY/ORPHANS

"Orphan" slides are slides that are not used in any defined show and, hence, might be candidates for deletion from the memory module. When the UTILITY/ORPHANS function is selected, a menu of orphan slides appears from which one can be selected for previewing and/or deleting. If there are no orphans, a message to that effect appears and the user can return to the UTILITY menu by pressing any key.

The system will only permit stock slides that are "orphans" to be deleted. Slides currently referenced in any show cannot be deleted. A slide must be deleted from each show in which it is used (possibly more than once in a show) before it can become an "orphan" and be eligible for deletion. The above-discussed UTILITY/USAGE function is provided to allow the user to determine in which shows a slide is used.

When a slide has been selected from the menu of orphan slides, a further menu appears: PREVIEW or DELETE.

The PREVIEW option is used to obtain a full-screen view of the stock slide selected from the list of orphans. Pressing any key returns the user to the UTILITY/ORPHAN menu.

The DELETE option is used to permanently delete an orphan stock slide image from the memory module. When a slide is so deleted, the memory used by that slide is returned to the free memory pool for use by new slide images. If this option is selected, a message appears asking the user to press the UP key to confirm the deletion.

5.c. UTILITY/DEFAULTS

The third of the UTILITY functions, DEFAULTS, permits a user to change, inter alia, the default delay, windowshade, and dissolve attributes. The revised attributes will be assigned to any slide thereafter captured or added to a show. (The system normally uses default values of 100 percent windowshade (i.e. full image always projected), BLACK (opaque) windowshade color, REPLACE dissolve type and MANUAL delay time). After the attributes have been changed with this function, the new attributes persist until changed again or until an ERASE function is performed (see below).

When the DEFAULT function is selected from the UTILITY menu, a menu of attributes and their current default values is displayed. To make a change, the user highlights the attribute of interest using the UP and DOWN cursor control keys and presses the ENTER key. The action to be taken from that point varies from item to item, as discussed below.

5.c.(i) UTILITY/DEFAULT/WINDOWSHADE COLOR

If the WINDOWSHADE COLOR attribute is selected, the user can toggle the windowshade between black (blocking light) and white (allowing light through) by pressing the ENTER key. In either case, the windowshade remains opaque in that the slide image never shows through the windowshade.

5.c.(ii) UTILITY/DEFAULT/WINDOWSHADE POSITION

When the user selects the WINDOWSHADE POSITION attribute, the menus disappear and a windowshade appears on the blank screen at its current default setting. The windowshade can then be adjusted up and down by using the WINDOW UP and WINDOW DOWN keys 176, 178 on the remote control. When the desired new windowshade position is reached, the user presses ENTER to set the new default windowshade at the displayed windowshade position.

(As noted, when the WINDOWSHADE POSITION function is selected, the screen is blank and clear. Consequently, if the windowshade color is white, it is desirable to change the default windowshade color to black momentarily to make the windowshade position easier to see. The windowshade color can then be returned to white if desired after setting the new position).

5.c. (iii) UTILITY/DEFAULT/DELAY

If the DELAY attribute is selected, a window appears displaying the current default delay time and prompts the user to press the UP or DOWN arrow keys to change the value displayed. When the desired value is reached, the ENTER key is pressed to set the new default.

5.c.(iv) UTILITY/DEFAULT/DISSOLVE

If the DISSOLVE attribute is selected, the user is presented with a menu of dissolve types. The user moves the reverse video highlighting bar to the desired one and presses the ENTER key to set the new default dissolve desired.

5.c.(v) UTILITY/DEFAULT/SEQUENCE # ON/OFF

Sequence numbers (the relative number of a slide within a show) can be displayed on-screen during a show at a user-selectable location. When the SEQUENCE # ON/OFF option is selected from the UTILITY/DEFAULT menu, the current state of the sequence number display during shows is shown as ON or OFF. Pressing ENTER toggles this state.

5.c.(vi) UTILITY/DEFAULT/SEQUENCE # LOCATION

The sixth and final attribute that can be changed with the UTILITY/DEFAULT menu is the location at which the sequence number (if ON) is to be displayed on the screen. When the SEQUENCE # LOCATION function is selected, a marker (a three digit sequence number of 000) is shown on the screen at the location where sequence numbers will appear. The eight direction cursor arrow keys can then be used to move this marker to the desired location. The change in location is effected by pressing the ENTER key.

5.d. UTILITY/ERASE

The ERASE function is provided to completely erase all show definitions and stock slides from memory module RAM 134. This function is provided so that the user need not delete shows and slide images one by one.

If the ERASE function is selected, the system asks the user to confirm the instruction by pressing the UP, DOWN, LEFT and RIGHT cursor control keys in sequence, followed by the ENTER key. Pressing ESCAPE at any time before the end of this sequence operates to abandon the ERASE function and leaves the memory module contents intact.

If the user performs the entire ERASE confirmation sequence, the memory of the memory module is erased and the defaults are set as follows: windowshade at 100 percent, BLACK windowshade, REPLACE dissolve type, MANUAL delay time, sequence number OFF and sequence number location near the lower left corner of the display.

REVISING CAPTURED SLIDES

It is often desirable to revise slides after they have been captured into memory. The present invention contemplates a number of such revision capabilities.

One such revision capability permits the addition of highlighting to a slide captured in memory. This is effected by displaying the slide and invoking the highlighting operation to highlight the desired portion(s) of the image. The revised image is then be stored back into memory as a separate stock slide image.

Another important revision capability permits the superposition of textual material onto a slide after it has been captured to memory. This can be used, for example, to customize a slide presentation to various applications by inserting different customer names, etc. in selected slides. This "captioning" operation is effected by displaying the slide and invoking the pointer to point to the location on the image where text is to be superimposed. A control sequence of keys on the remote control is then entered to convert the remote control keys to alphanumeric counterparts. The desired text is then entered by pressing the appropriate keys. The particular font and typesize in which the text is displayed have default values. However, these values can be changed by using a typeface menu that is controllably invoked from the remote control. After the desired text has been entered, the revised slide is stored back into memory as a separate stock slide image.

(In alternative embodiments, rather than using alphanumeric counterparts to the remote control keys for text entry, a menu displaying the full complement of ASCII characters is presented. The characters can then be selected seriatim from the menu for insertion into the image).

A final revision capability permits the addition of graphics to captured slide images. This feature operates similarly to the text entry feature discussed above. However, instead of using the remote control unit as an alphanumeric pad, it is used as a line drawing controller. The cursor direction keys are used to extend lines to desired positions on the displayed image. Others of the keys are used to insert stock graphical elements, such as circles and arrowheads. A control menu can be invoked onto the display to control the size of these graphical elements. After the image has been revised in the desired manner, it is again stored back into memory as a separate stock slide image.

This concludes the operational review of the illustrated embodiment.

THEORY OF OPERATION

Figure 14A:
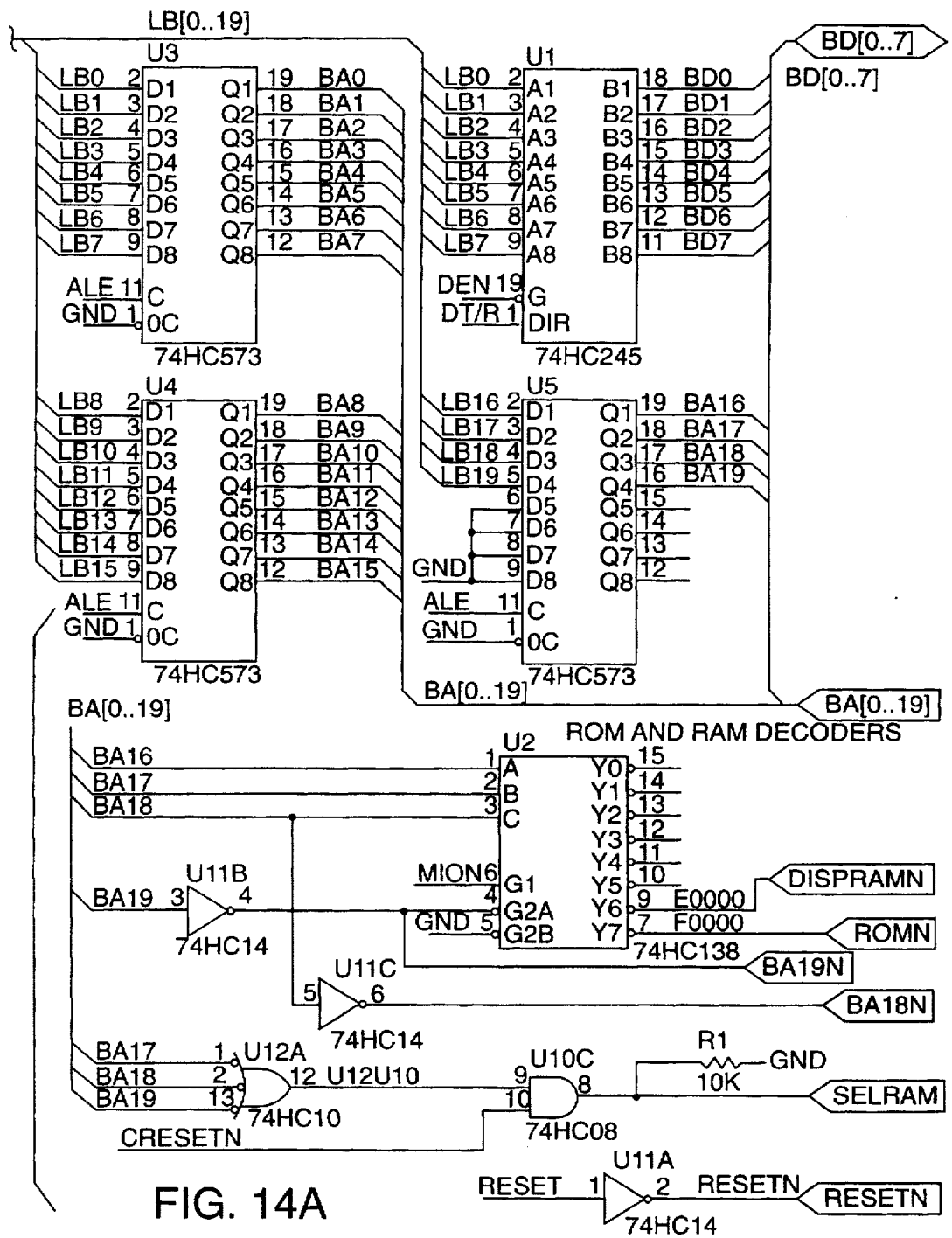
FIG. 14, comprised of FIGS. 14A and 14B, is a schematic diagram showing CPU and demultiplexer circuitry used in the memory module of FIG. 5.
Figure 14:
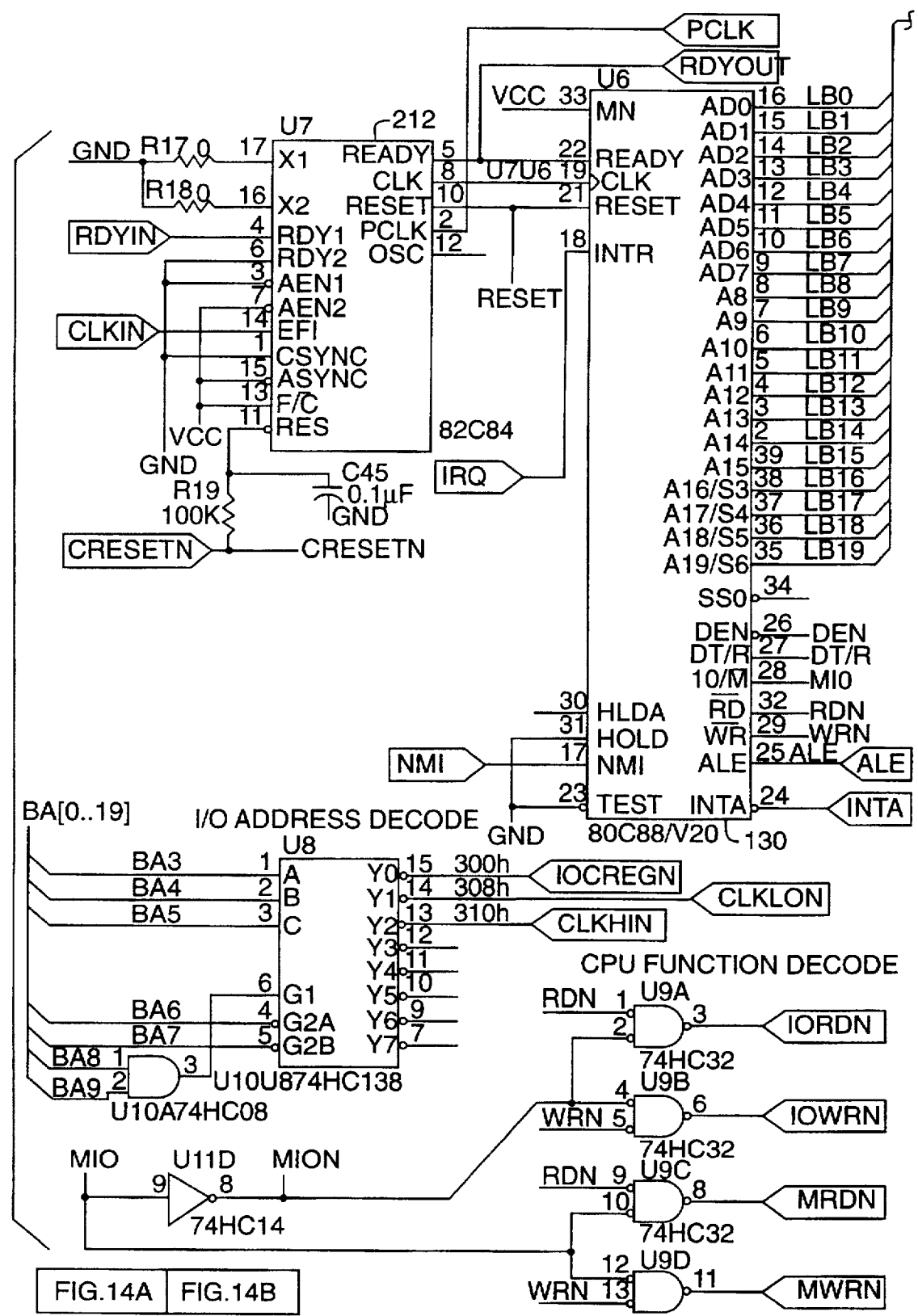

FIG. 14—CPU and Demultiplexer

The memory module used in the illustrated embodiment is built around a conventional Intel 80C88 processor 130. An 82C84 chip 212 generates the clock for the CPU. The CPU clock is the incoming CLKIN (sixteen or twenty megahertz provided from the LCD display unit 102) divided by three, yielding a clock frequency of 5.33 or 6.66 megahertz. The 82C84 generates the reset signal (high) for the CPU. R19 and C45 keep the reset pulse asserted until the reconstructed video clock CLK in the LCD display unit 102 stabilizes (approximately ten milliseconds). The incoming reset signal, CRESETN, comes from FIG. 15. The 82C84 also generates PCLK, which is the incoming clock divided by twelve. This PCLK signal is used as a time base for the remote control circuit 40 of FIG. 17. Finally, the 82C84 generates a ready signal for the CPU, as discussed in detail in connection with the interface circuitry of FIG. 17.

Chips U3, U4 and U5 demultiplex the CPU address/data bus. U1 is a data bus transceiver. These functions are standard parts of any 8088-based design. U9 and U11D decode the CPU M/IO (memory or I/O), RD (read) and WR (write) lines to generate I/O and memory read/write strobes. U8 and U10A decode processor I/O accesses. Actually, they decode any addresses whose low order ten bits are in the range of 300 to 340. These decodes are used in conjunction with the IORDN and IOWRN from U9 to accomplish I/O. Specifically, the addresses 300–307, 310 and 318 are used for I/O devices.

U2 and U11B decode references to memory in the range of E0000–EFFFF for the frame buffer 110 and F0000–FFFFF for the ROM 132. U12A decodes references to memory in the range of 00000–DFFFF for the data RAM 134. U10C is part of the power-down memory protection circuitry which is discussed in conjunction with FIG. 15.

Figure 15A:
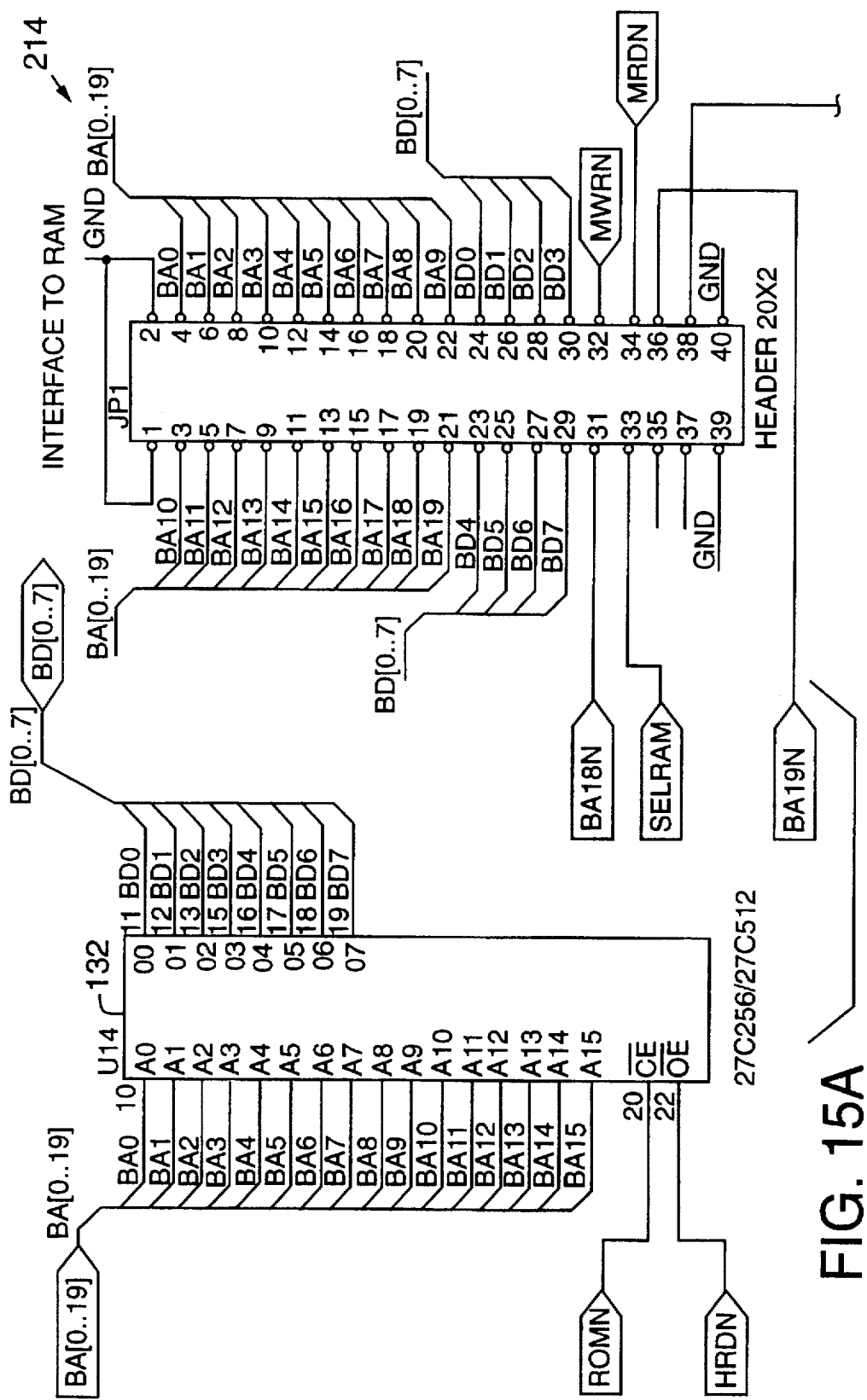
FIG. 15, comprised of FIGS. 15A and 15B, is a schematic diagram showing ROM, RAM interface and power on reset/power fail detect circuitry used in the memory module of FIG. 5.

FIG. 15—ROM, Data RAM Interface and Power On/Power Down Circuitry

A ROM U14 132 provides either 32K or 64K bytes of firmware storage. Either a 27256 or a 27512 can be used. If a 27256 is used, it should be addressed from F8000 to FFFFF so that pin 1, (A15 on a 27512, VPP on a 27256) will be high, which it should be when the ROM is in read mode. The firmware provided in the attached Appendix uses 28K of the 32K available in a 27256. If the firmware requires more than 32K, a 27512 can be used, which can be addressed from F0000 to FFFFF.

A RAM interface 214 provides the RAM data bus with the lower eighteen bits of the address bus, true and inverted versions of the most significant two address bus bits, a master decode signal, SELRAM (select RAM), and MWRN and MRDN (memory read/write strobes). More discussion of the RAM operation appears under the heading RAM Board below.

The 28 individual RAM chips which comprise RAM memory 134, their associated decoders (474HC138s) and U29, the power-on-reset/power fail detect circuit, are powered from a backup battery 136, a 3.0 volt/1600 mAH lithium cell, when the +5 volts from the main supply is not present. The power-off drain on the battery is about twenty-five microamperes at room temperature which should give it six to ten year life according to the battery manufacturer.

R10 and R12 in the Power-On, Reset and Power-Fail Detect circuitry 216 form a divider driving one trigger input of U29 and are selected to hold pin 7 of U29 low whenever VCC is less than approximately four volts. R11 provides about 0.2 volts of hysteresis. When VCC is not present, U29 holds the CRESETN line low. This disables U10C and deasserts SELRAM, thereby preventing any of the RAM chip selects from being asserted. U10C is not powered at this time, of course, so R1 pulls SELRAM low.

When VCC is turned on, U10C is powered, but as long as VCC is below four volts, CRESETN is held low, preventing SELRAM from being asserted. Technically, U10C should also be powered from the backup battery 136 to keep its output from behaving uncontrollably when VCC is outside specifications, but experimental observations of U10C has confirmed that its output is well behaved for all values of VCC.

As VCC rises above four volts, CRESETN goes high, allowing SELRAM possibly to go high, depending upon whether a valid RAM address is decoded. However, at this time, RESET is still asserted to the CPU. No bus activity has begun, so there cannot be any assertions of MWRN (memory write). RESET to the CPU is asserted until approximately ten milliseconds later, time for the crystal oscillator in the LCD display unit 102 to stabilize. The CPU's first activity once RESET is de-asserted is to fetch its start-up code from the ROM 132 at FFFF0.

The power down sequence is as follows: As VCC falls to approximately 4.5 volts, according to the values chosen for R14 and R16, pin 1 of U29 goes high, generating a non-maskable interrupt (NMI) to the CPU 130. The NMI interrupt routine masks the IRQ interrupt and executes a halt instruction, effectively freezing the CPU. All bus activity therefore stops. When VCC falls to 4.0 volts, CRESETN goes low.

In practice, an internal problem in U29 (to be discussed below), as well as loose tolerances on the trigger points for U29, mean that the NMI on power down does not occur reliably. For this reason, and because the RESET signal to U7 and hence to the CPU is delayed at power down, as well as at power up, by R19 and C45, the CPU may still be running when CRESTN is asserted. However, CRESETN going into U10C effectively "squelches" any memory cycle that may be in progress at that point and it is believed that aborting a memory write cycle will not harm RAM locations other than the one being addressed at the time. (It is assumed that a noncritical RAM location is being written).

The problem with U29, the ICL7665, is that its internal reference, and hence its trigger points, have no power supply rejection at frequencies above DC. Therefore, as VCC falls, at about a volt per millisecond, RAMVCC falling from five volts to three volts (to the backup battery voltage) momentarily depresses U29's trigger point so that triggering does not occur at the nominal 4 or 4.5 volt figures mentioned above. C29 was added to hold up RAMVCC and minimize this effect.

Figures 16, 16A:
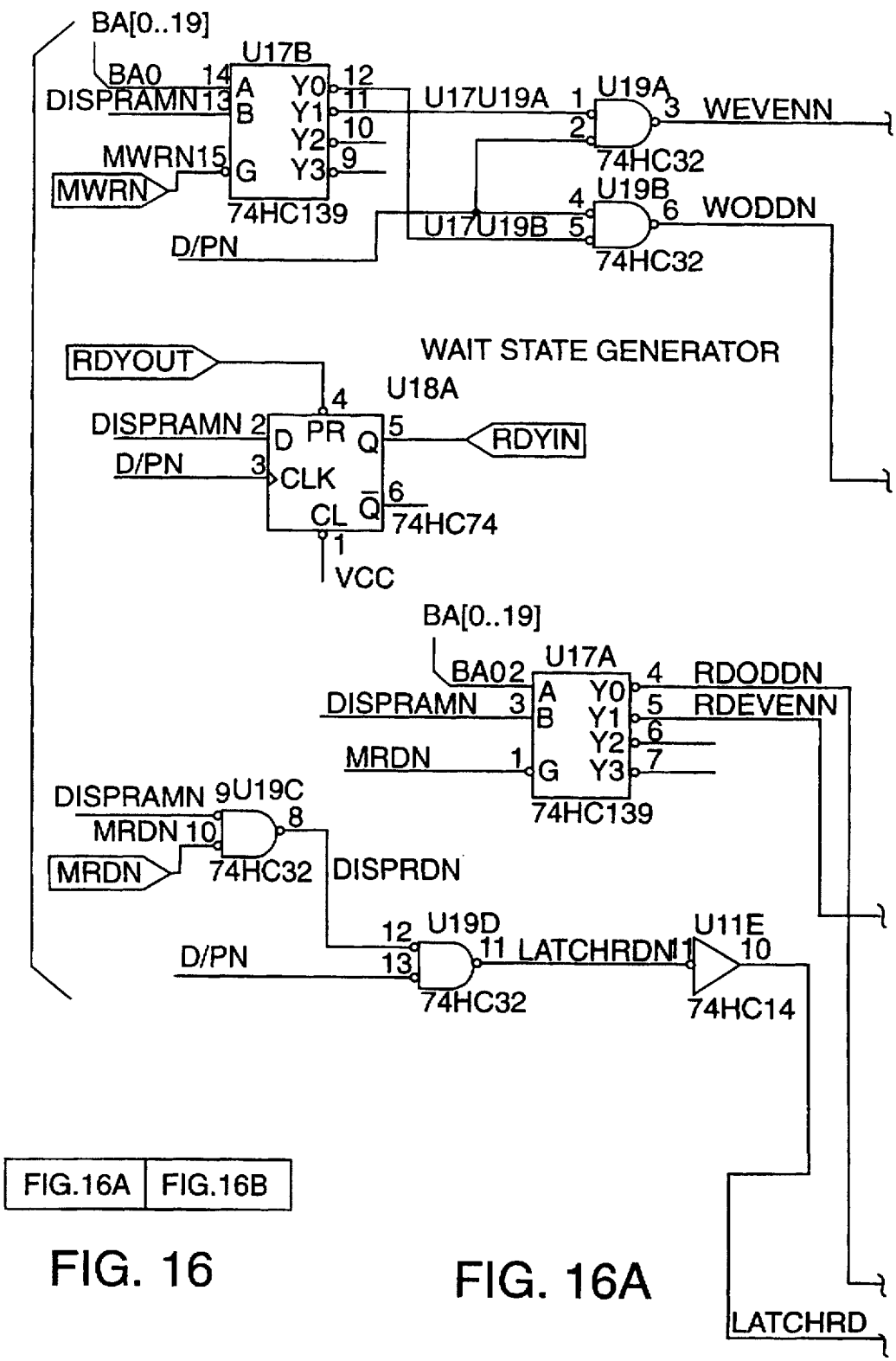
FIG. 16, comprised of FIGS. 16A and 16B, is a schematic diagram showing a display interface circuit used in the memory module of FIG. 5.
Figure 16B:
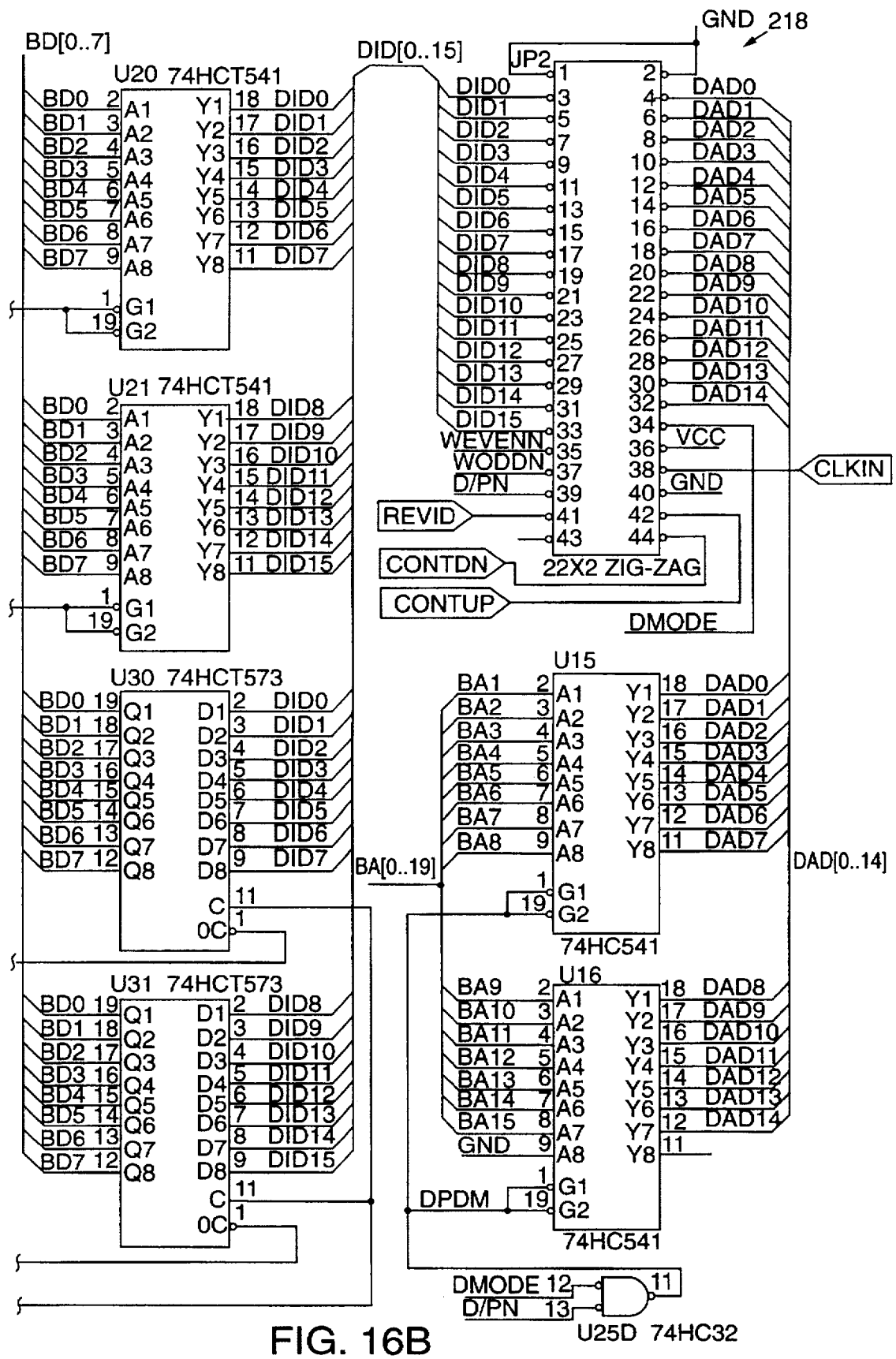

FIG. 16—Display Interface (In the following discussion, the timings given are for a sixteen megahertz clock signal from the LCD display unit 102. The timings can be multiplied by a factor of 0.8 if a twenty megahertz oscillator is used.)

The frame buffer 110 of the LCD display unit 102 appears to the memory module 104 as 32K 16-bit words. When the memory module accesses the frame buffer, the display interface circuitry 218 presents address-bus bits 1-15 to select a 16-bit word, and then uses address bit zero, the LSB, to select between the two bytes in the chosen word. When the memory module reads the frame buffer, both bytes are presented by the display, both are latched in U30-U31, but only one is gated onto the data bus. When the memory module writes to the frame-buffer, only one byte's data lines are driven (by U20 or U21) and only one of the two write strobes is asserted.

The terms "even" and "odd" are used to refer to the two bytes. However, due to an early misunderstanding, they were misnamed on the schematic, so the "even" byte is actually the one accessed when address bit zero is high (the odd address) and vice versa.

So much for a "static" view of the display interface circuitry 218. The frame buffer 110 is, however, triple ported, in that it is accessed by the display interface circuitry 218, by the output buffer 112 and by the input shift register 108. These accesses must be arbitrated. The D/PN signal (for display/processor not) is a 500 nanosecond square wave generated by the LCD display unit 102. When the display unit is displaying external input (i.e when D/PN is high), LCD refresh data is read from the frame buffer to the output buffer. When D/PN is low, external data is written into the frame buffer.

The display interface circuitry 218 provides a signal called DMODE to the LCD display unit over cable 122. DMODE is high when the display unit is displaying external data, as described above. DMODE has a pull-up resistor inside the display unit, so it is high when the memory module is not connected.

When the display interface circuitry 218 accesses the frame buffer 110, it latches DMODE low. In this case, read out of data to the output buffer 112 for LCD refresh still occurs when D/PN is high, but when D/PN is low, the interface circuitry can read or write the frame buffer.

When D/PN is low and DMODE is high, the frame buffer may be written, but will not be written unless an external signal is present. Likewise, when D/PN is low and DMODE is low, the frame buffer may be read or written by the memory module, but only if an actual memory module access cycle is in progress. LCD refresh read to the output buffer 112 is the only activity which goes on unconditionally.

If an external signal is present (such as in LIVE mode), the effect of the display interface pulling DMODE low is to suspend display writes and therefore to "freeze" the display in its current state. The memory module firmware "captures" display images by raising DMODE, waiting until the user signals that the image is correct (through a remote control key) and then lowering DMODE and reading out the display.

D/PN is generated by dividing the sixteen megahertz clock CLKIN by eight. As noted earlier, the 82C84 chip 212 generates the CPU clock by dividing this sixteen megahertz clock by three. These timing factors, plus the fact that the memory module CPU cycles consist of varying numbers of CPU clocks (depending on the instruction being executed), mean that the D/PN low "window" (the time when the memory module may actually access the frame buffer) is asynchronous with respect to the CPU read and write strobes. Therefore, it is necessary in some cases to resynchronize via CPU wait states.

A simple scheme is used. The output of U18 FIG. 16) is set low by the rising edge of D/PN whenever DISPRAM is low because of a decode of a CPU address in the frame buffer space. The rising edge of D/PN is used to trigger U18A, rather than the falling edge, because U18A must be triggered in anticipation of a window, rather than by the actual window.

RDYIN to the 82C84 chip 212 (FIG. 14) is pulled low for every memory module access to the frame buffer. Consequently, READY to the CPU is pulled low every access. However, READY low (i.e. NOT READY) to the CPU only causes a wait state if it occurs during the CPU's T3 state. That happens, not coincidentally, to be the case when it is needed. U10A is preset by READY from U7 so, at most, only one wait state is inserted.

Figure 18A:
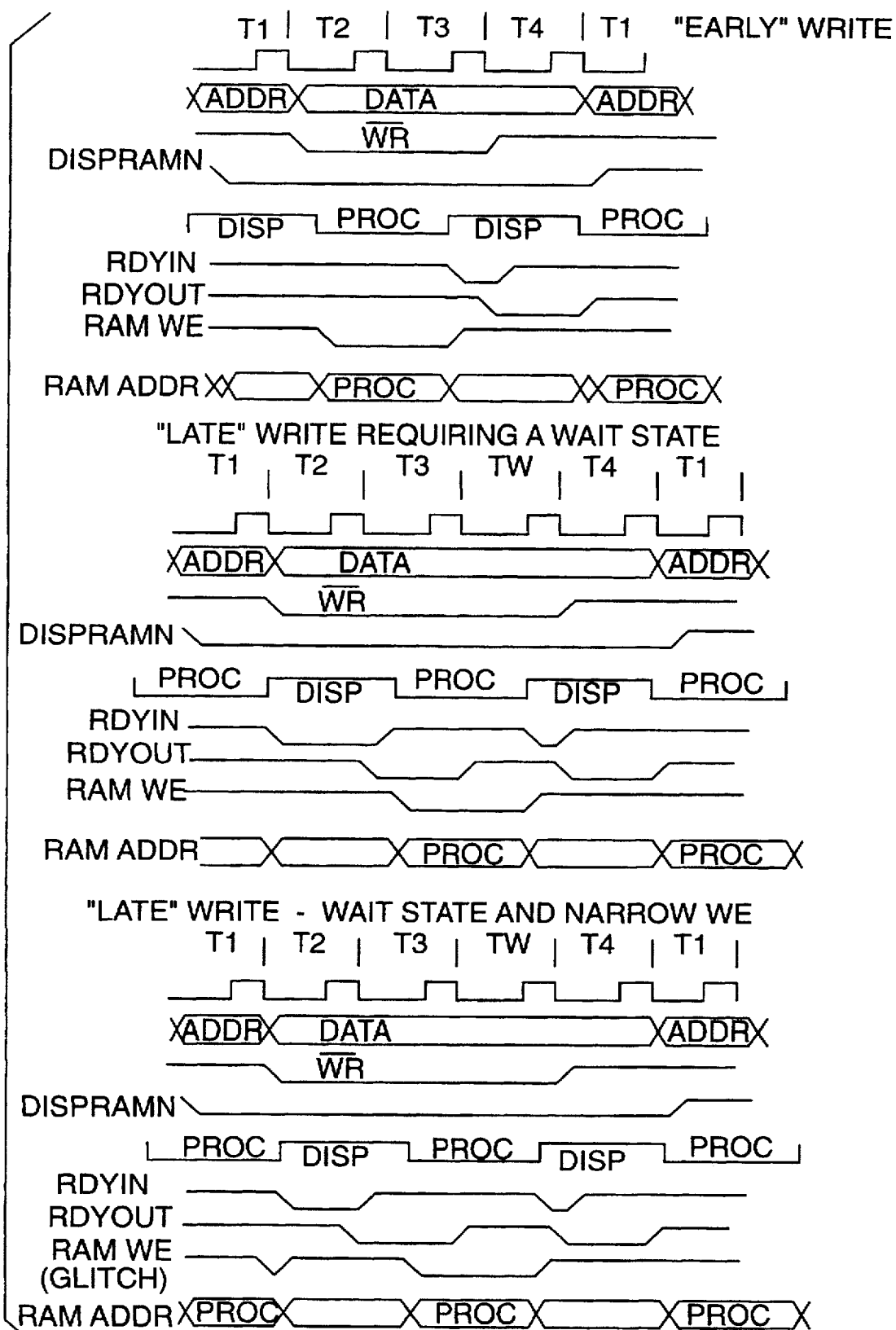
FIG. 18 is a collection of timing diagrams showing signal levels associated with the memory module of FIG. 5.
Figure 18B:
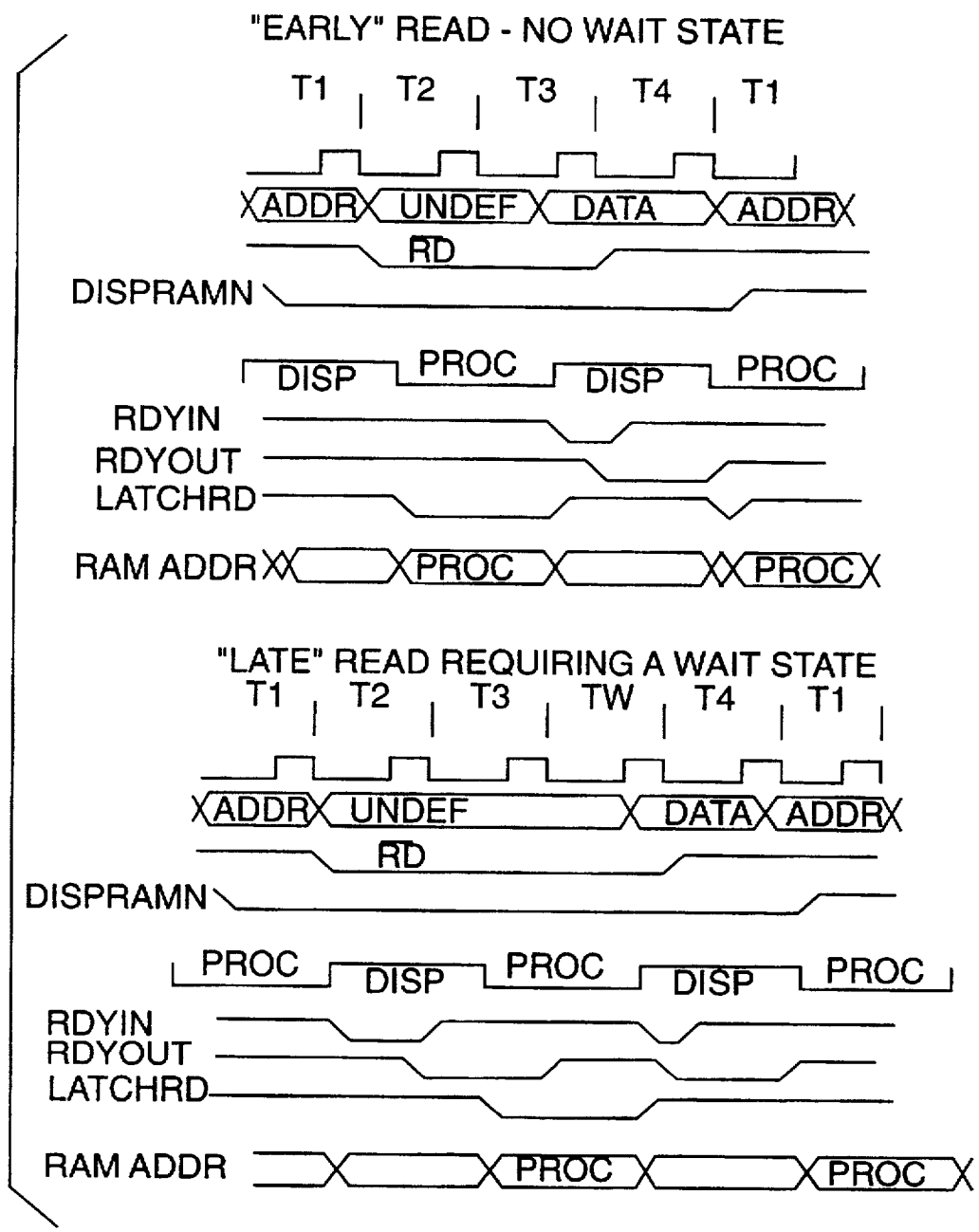
Figure 18:
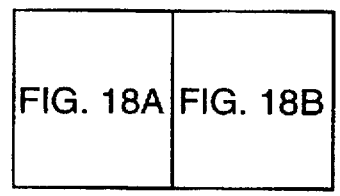
Figure 19A:
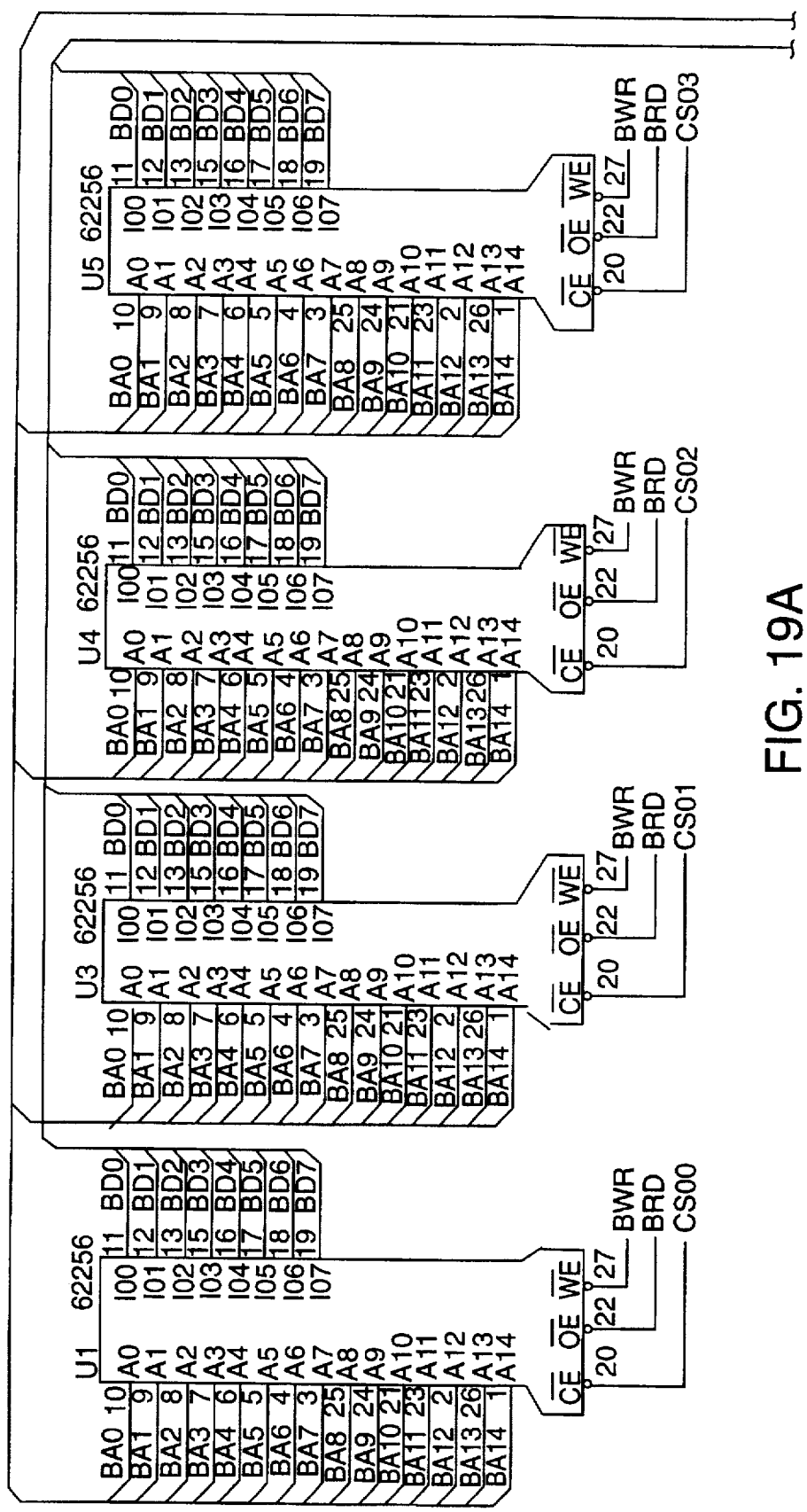
FIG. 19, comprised of FIGS. 19A and 19B, is a schematic diagram showing a first portion of RAM circuitry used in the memory module of FIG. 5.
Figure 20A:
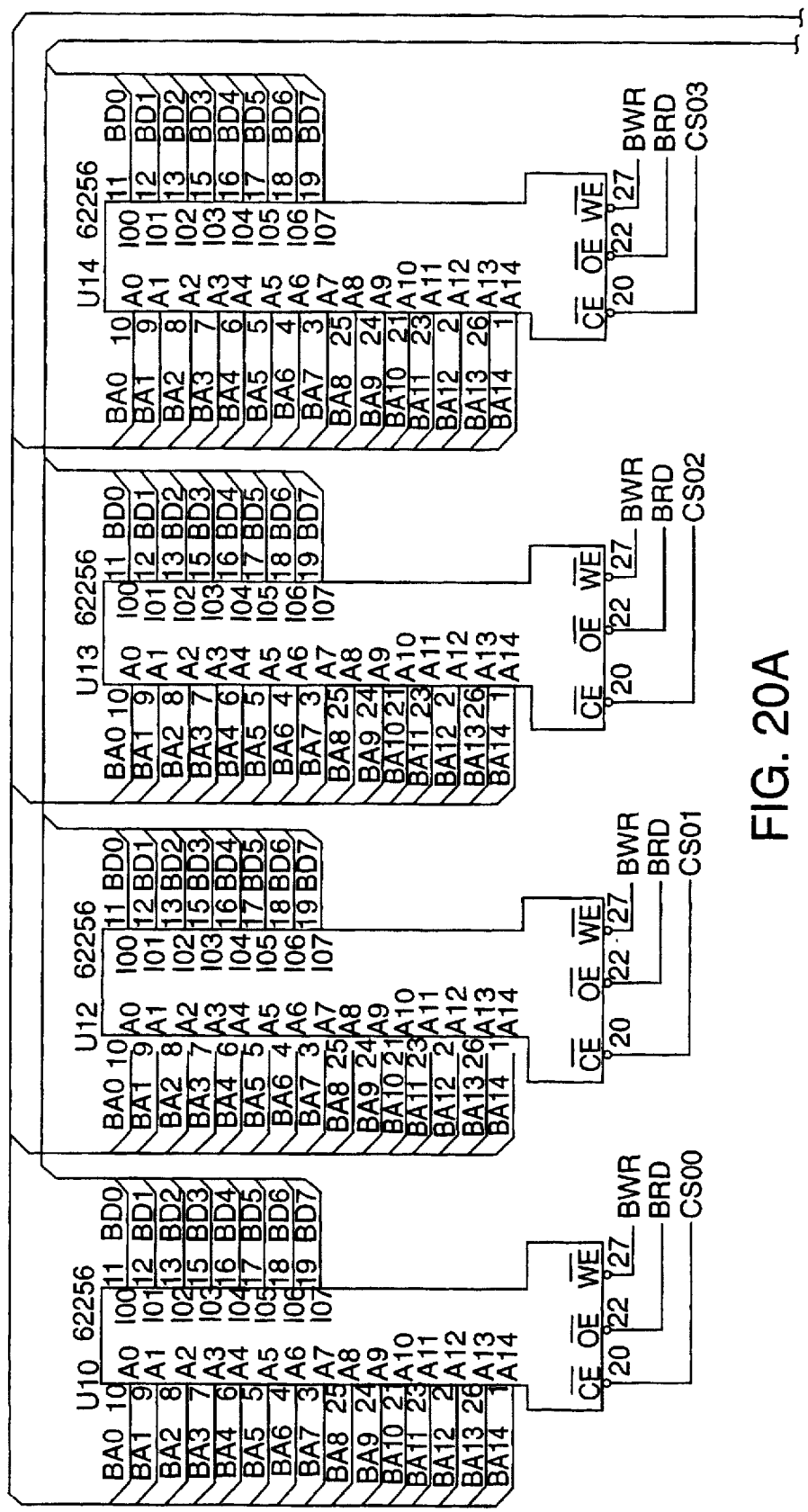
FIG. 20, comprised of FIGS. 20A and 20B, is a schematic diagram showing a second portion of the RAM circuitry used in the memory module of FIG. 5.
Figure 21A:
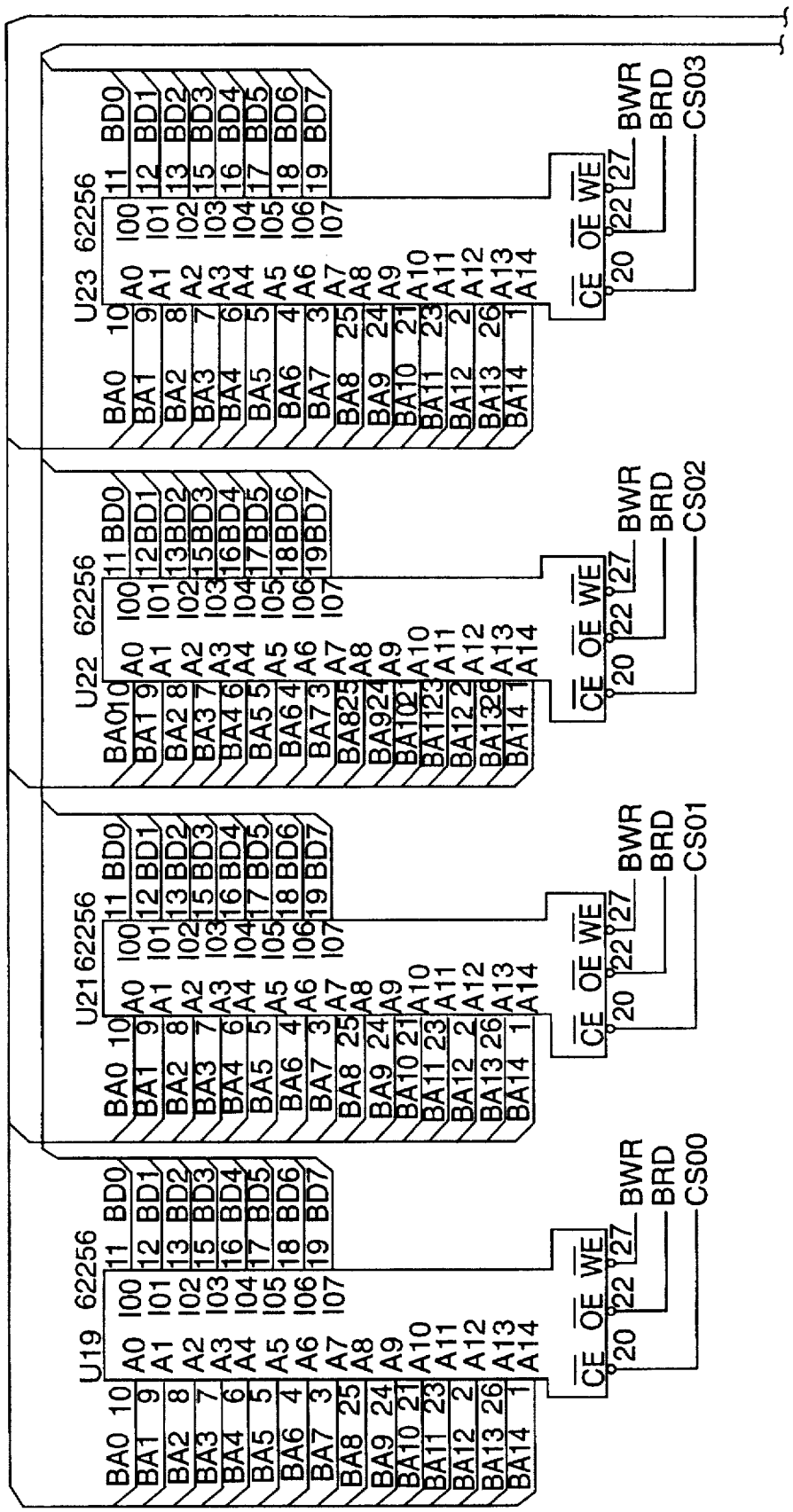
FIG. 21, comprised of FIGS. 21A and 21B, is a schematic diagram showing a third portion of the RAM circuitry used in the memory module of FIG. 5.
Figure 22:
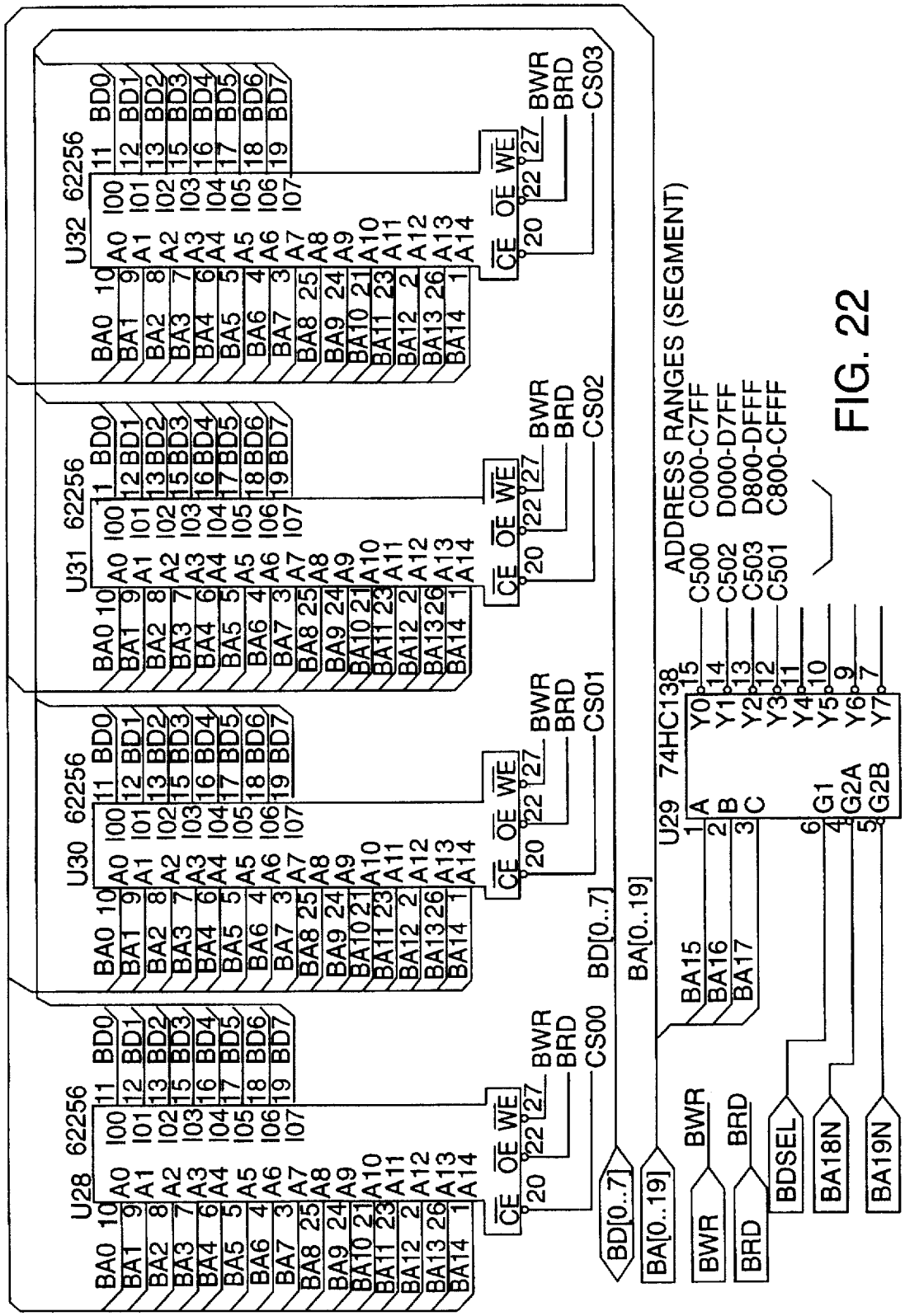
FIG. 22 is a schematic diagram showing a fourth portion of the RAM circuitry used in the memory module of FIG. 5.

The timing diagrams of FIG. 18 show some of the possible cases of D/PN timing versus CPU clock timing. As can be seen, only when the D/PN "windows" occur late with respect to the CPU clock is a wait state needed. The timing that results dictates that read data be latched (by transparent latches U30 and U31), but write data can be presented by mere transceivers (U20 and U21).

One quirk of this design is that, in some cases, a double write cycle occurs. In these cases, the write pulse is short, sometimes shorter than the RAM specifications allow. However, this short write pulse is always preceded by address set-up exceeding the RAM specifications and is followed by a full-length write pulse with the same address. No improper operation has been observed.

U15 and U16 drive the frame buffer address bus 120 with the memory module CPU address only when DMODE is low and during the low portion of the D/PN cycle. Nothing prevents the memory module from accessing the frame buffer without latching DMODE low first. However, if it does so, the memory module address will not be applied to the frame buffer.

U17B and U19A/B generate write strobes (WEVENN or WODDN depending upon the low-order CPU address line) for the frame buffer and assert the CPU data onto the frame buffer "even" or "odd" data lines via U20 and U21.

U11E and U19C/D generate LATCHRD to latch the frame buffer data into U30 and U31. Both bytes are always latched. However, only the selected "even" or "odd" byte is gated onto the CPU bus by RDODDN or RDEVENN from U17A.

Figures 17, 17A:
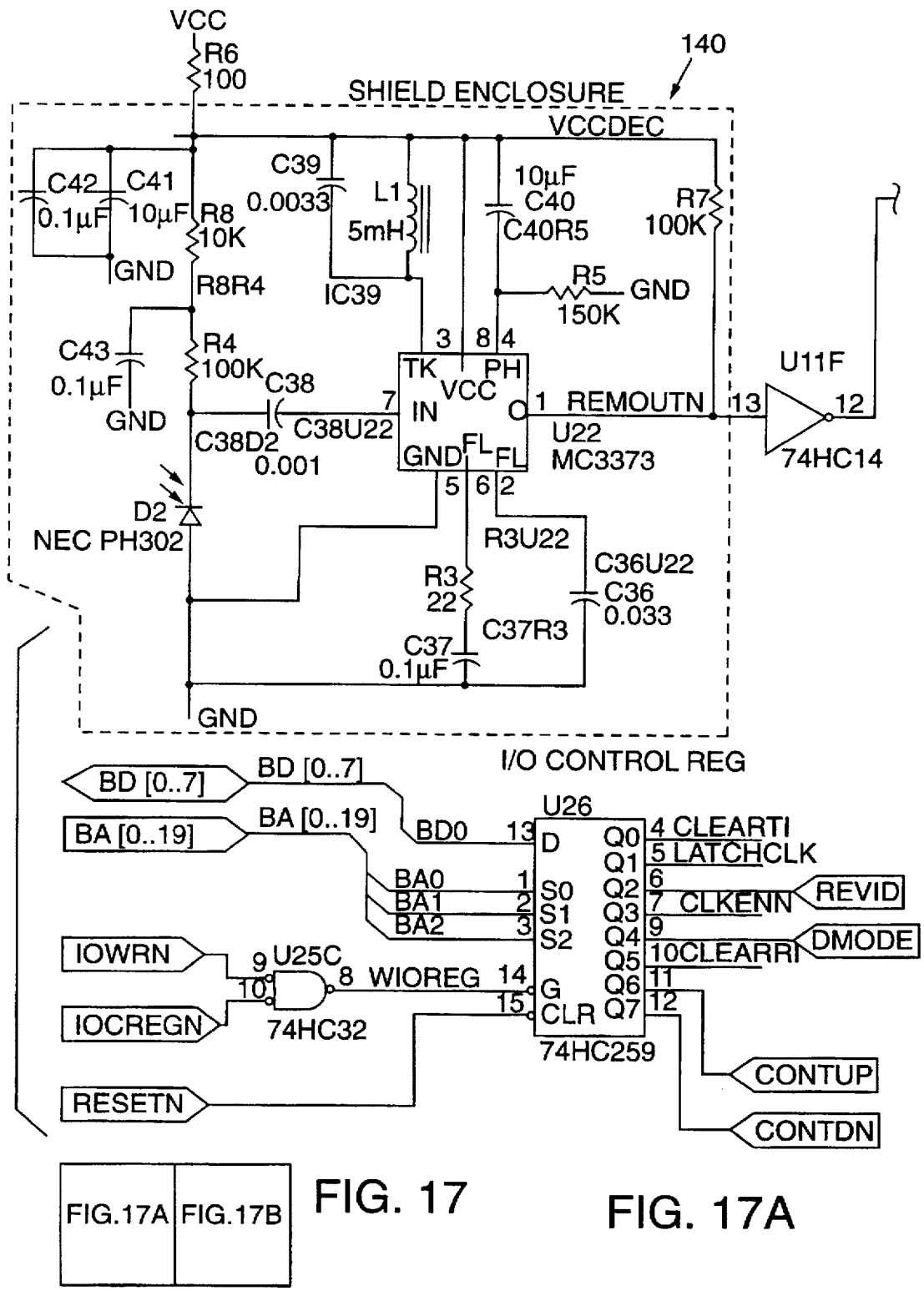
FIG. 17, comprised of FIGS. 17A and 17B, is a schematic diagram showing input/output, remote control and time base circuits used in the memory module of FIG. 5.
Figure 17B:
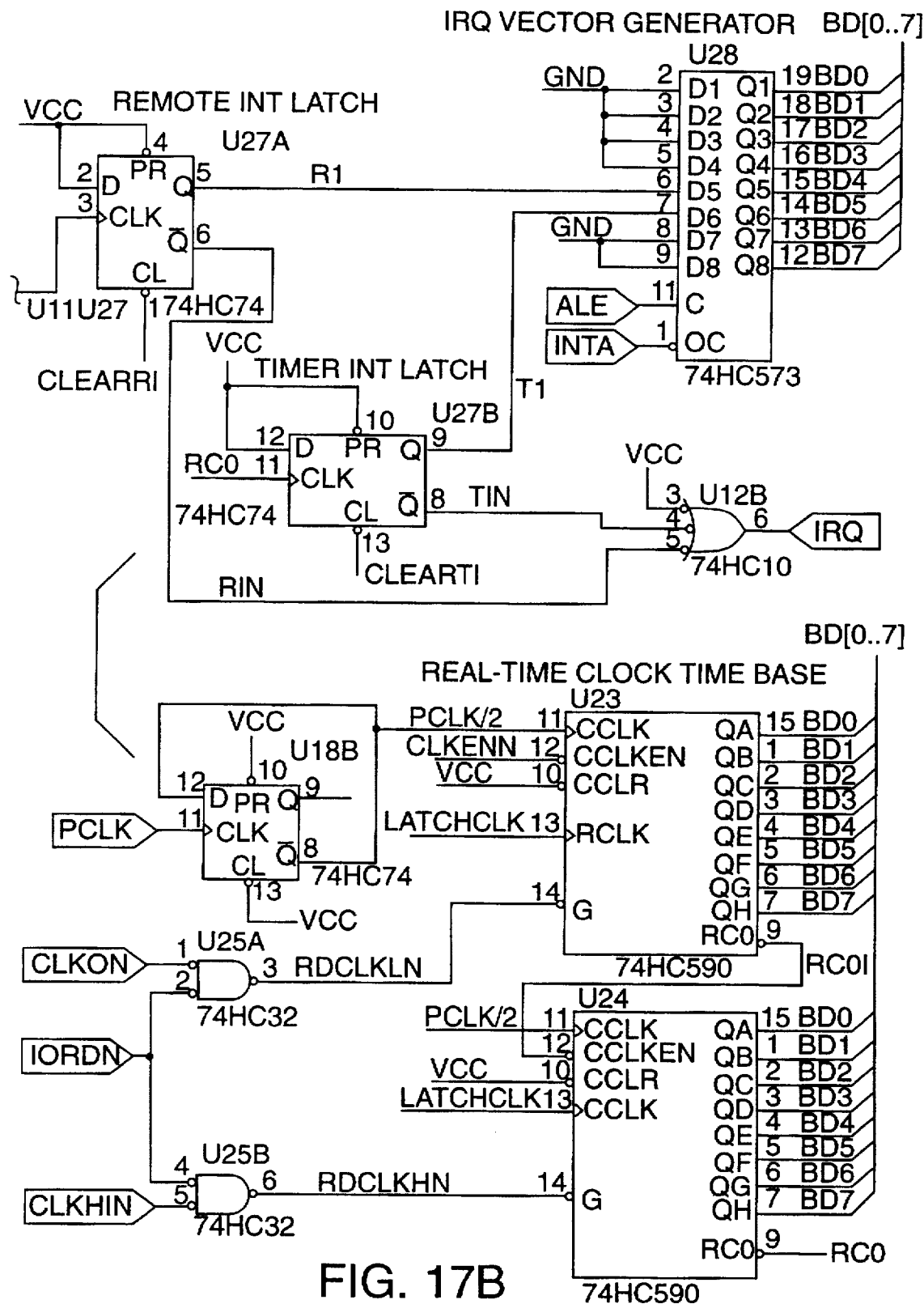

FIG. 17—I/O and Remote Control

U26 implements 8 1-bit output ports at addresses 300–307. When the CPU issues an OUT instruction to one of these addresses, the LSB of the data bus is written to the selected port. U26 is initialized by RESETN with all eight outputs low. The ports must then be set to their desired normal states by the firmware when it starts up. The eight ports have the following functions:

- 300—CLEARTI—resets the timer interrupt latch, U27B, when written with a "0". This port is normally left at "1" and pulsed low as needed.
- 301—LATCHCLK—a transition from "0" to "1" latches the current timer counter value into the timer output registers. This port can be left in either state when not active.
- 302—REVID—this is the reverse video strobe to the LCD display unit. A "1" to "0" transition of this port is equivalent to pushing the REVERSE VIDEO key on the LCD display unit. It must be left at "1" when inactive in order not to interfere with the REVERSE VIDEO key on the unit itself.
- 303—CLKENN—this port allows the real time clock counter to run when "0". It is brought to a "1" to stop the clock when the clock is being read out.
- 304—DMODE—this line is discussed in the above description. A "0" on this port means the memory module has taken control of the display.
- 305—CLEARRI—a "0" clears the remote interrupt latch. This port is left at "1" and is pulsed low when needed.
- 306—CONTUP—this line goes to the LCD display unit. A "1" to "0" transition of this port is equivalent to pushing the CONTRAST UP key on the unit. It must be left at "1" when inactive in order not to interfere with is CONTRAST UP key.
- 307—CONTDN—this line also goes to the LCD display unit. A "1" to "0" transition of this port is equivalent to pushing the CONTRAST DOWN key on the unit. It also must be left at "1" when inactive in order not to interfere with this CONTRAST DOWN key.

The remote control receiver circuitry 140 is shown in the upper left side of FIG. 17. U22 is a high-gain amplifier and demodulator tuned by L1 and C39 to detect the bursts of forty kilohertz modulated infrared emitted by the remote control and detected by photodiode D2. (It is the envelope of the forty kilohertz burst that comes out of U22, not each forty kilohertz cycle.) The remote control employs a standard pulse code modulation format used throughout the television industry.

Each remote control burst causes a positive edge to latch U27A on and assert IRQ to the CPU. The firmware determines the timing of the pulses by reading U23 and U24 and determines the code being sent. The interrupt service routine pulses CLEARRI low to clear U27A.

U23 and U24 constitute a 16-bit timer which is clocked at sixteen megahertz divided by twelve (PCLK is a divide by six and U18B is a further divide by two). Each "tick" of this timer is about 700 nanoseconds, so the firmware can measure the timing of the remote control bursts down to this resolution. It does so by stopping the clock by raising CLKENN, pulsing LATCHCLK to latch the timer value, and then restarting the clock by lowering CLKENN. It then reads out the low and high eight bits of the time by reading I/O addresses 310 and 318 respectively.

When the 16-bit counter in U23/U24 overflows every 65,536 clock cycles, it triggers U27B, which generates an interrupt request. The interrupt service routine for this interrupt increments a 32-bit word in memory. The firmware, therefore, has access to a 48-bit time value, 32 bits in memory and 16 bits from the counters.

The two interrupt sources, timer overflow and remote control, are ORed by U12B to produce the CPU interrupt request. When the CPU recognizes an interrupt, it asserts the INTA signal which gates U28 onto the data bus as an interrupt vector number. This value is either 10, 20 or 30 (hex) depending on which combination of interrupts (timer or remote) is active. The firmware stores the address of the remote control interrupt service routine at vectors 10 and 30 and the timer interrupt service routine at vector 20. This prioritizes the remote control interrupt since if both interrupts are present, the remote control interrupt is taken. The timer interrupt is serviced only after the remote interrupt is cleared.

The two interrupt bits are latched into U28 once each CPU cycle by ALE. Either interrupt can occur asynchronously with respect to the CPU cycle. If it were not latched, an interrupt coming in at the instant the CPU was gating the vector onto the data bus could cause an undefined value to be generated.

FIGS. 19–22—RAM

The RAM memory 134 contains 896K of static RAM, addressed from 00000 to DFFFF, in three banks of 256K (8 32K chips) and one of 128K (4 32K chips). Each bank has its own 74HC138 decoder to select among its RAM chips.

The four banks are almost identical except different combinations of the true and inverted version of A18 and A19 (the two most significant CPU address lines) are used to enable each bank.

Each RAM's OE (output enable) line is connected to the MRDN (memory read) signal generated by the RAM interface circuitry 214. Similarly, each RAM's WE (write enable) line is connected to the MWRN signal from the interface circuitry. Only for the one RAM chip that is also supplied a CE (chip enable) signal does OE or WE have any effect, as these signals are ANDed with CE internal to the RAM.

In addition to bank selection with A18 and A19, a single master decode line, called BDSEL (board select, SELRAM in FIG. 14) must be high for any of the four decoders to be enabled.

SPREADSHEET APPLICATION

A novel application of the illustrated electronic transparency, or of any electronic transparency, is in the interaction it permits in spreadsheet analysis. Spreadsheet programs have typically been run by persons interested in finance to project future financial conditions of an organization. The accuracy of the projections, however, relies on the accuracy of the assumptions on which it is based. Often the person running the spreadsheet program is not the one best qualified to make all of the necessary assumptions.

To overcome this problem, it has been found advantageous to assemble in one room the various persons who are best qualified to make the necessary assumptions. For example, in using a spreadsheet program to forecast the next month's revenue of a manufacturing company, the inventory manager may have knowledge of inventory constraints that may limit production, the personnel manager may have knowledge of upcoming personnel vacations that may affect productivity, the marketing manager may have knowledge of impending orders that will affect sales, etc. In the prior art, these persons may have been asked for the data on which the analysis could be based, but did not have an opportunity to interactively revise their data in response to corresponding data from persons responsible for other facets of the operation.

According to the present technique, these various persons are assembled and the spreadsheet program is run, with the output displayed by an electronic transparency on a screen visible to all. The group can then be asked about the accuracy of certain assumptions on which a first spreadsheet analysis has been based. If the inventory manager knows the assumed production cannot be achieved due to inventory constraints, he may suggest that it be revised downwardly to a more realistic level. This lower production level may prompt the personnel manager to lower his estimate of overtime expenses that had been predicated on the earlier production value. This in turn may prompt other changes by the other persons assembled. This interactive modification of the assumptions on which the analysis is based continues until all of the persons assembled agree that the underlying assumptions appear acceptable. The result is a final spreadsheet analysis that accurately reflects the interdependencies between the underlying data, a critical factor that would have been neglected using conventional spreadsheet techniques.

ALTERNATIVE EMBODIMENTS

Having illustrated the principles of our invention with referenced to a preferred embodiment, it should be apparent that the invention can be modified in arrangement and detail without departing from such principles. For example, one alternative embodiment of the present invention includes a zoom feature whereby the displayed image can be magnified about a point determined by the pointer. A video coprocessor interpolates the existing data to generate the additional data required at the higher, zoom magnification. Similarly, another alternative embodiment includes a windowing feature whereby one stock slide can selectably be displayed in windowed fashion over another. Still other alternative embodiments can be constructed to present displays in color by replicating certain of the illustrated circuitry three times, once for each of the red, green and blue video data signals. Gray scaling of the image can be achieved by using shades or different intensities of the same color. Finally, instead of identifying the slide shows by number, and instead of using sequence numbers to identify particular slides within a show, alphanumeric names and titles can readily be substitued therefor.

In view of these and the wide range of other embodiments to which the concepts of the present invention can be applied, it should be recognized that the foregoing description is illustrative only and is not to be construed as limiting the scope of the invention. Instead, we claim as our invention all such modifications as may come within the scope and spirit of the following claims and equivalents thereof.

We claim:

1. A projection display apparatus operable to form a display image on a projection screen, comprising:

a light source;

a transmissive light modulating element for modulating light generated by the light source to form the display image;

a display data input for receiving display data from a remote computer;

a modulation controller in communication with and controlling the light modulating element, the modulation controller including a data storage medium for selectively storing plural frames of display data received from the remote computer, the plural frames of display data corresponding to plural separate display images, the modulation controller controlling the light modulating element selectively in accordance with display data as it is received from the remote computer or in accordance with selected frames of display data retrieved from the data storage medium, the transmissive light modulating element and the modulation controller being supported by a common housing; and projection optics for projecting the display image toward the projection screen.

2. The projection display apparatus of claim 1 in which the data storage medium includes random-access memory circuitry.

3. The projection display apparatus of claim 1 in which the data storage medium comprises a removable data storage medium that is removable from the projection display apparatus and that retains the plural frames of display data when removed therefrom.

4. The projection display apparatus of claim 3 in which the data storage medium includes memory sites for storing slide show information that defines a sequence for displaying plural display images.

5. The projection display apparatus of claim 3 in which modulation controller includes an image editor for editing display data and in which the edited display data is stored in the data storage medium.

6. The projection display apparatus of claim 1 further comprising a microprocessor in communication with the data storage medium for controlling retrieval of the selected frames of display data from the data storage medium.

7. The projection display apparatus of claim 1 further comprising a remote control means by which a user can remotely control operation of the projection display apparatus, including selection of a frame of display data from the data storage medium for controlling the light modulating element to form a corresponding selected display image on the projection screen.

8. A projection display apparatus operable to modulate light to form a display image on a projection screen, comprising:

a modulation controller for controlling the light modulating element;

a case element that supports the light modulating element; and a data storage medium selectively storing plural frames of display data and supported by the case element in communication with the modulation controller, the plural frames of display data corresponding to plural display images, the modulation controller selectively storing in the data storage medium plural frames of data provided to the projection display apparatus by a remote computer and selectively retrieving frames of display data from the data storage medium and controlling the light modulating element in accordance with the selected frames of display data.

9. The projection display apparatus of claim 8 in which the data storage medium is separable from the case element and comprises a memory storage medium that retains stored data when separated from the case element.

10. The projection display apparatus of claim 9 in which the data storage medium includes memory sites for storing slide show information that defines a sequence for displaying plural display images.

11. The projection display apparatus of claim 8 in which the data storage medium includes random-access memory circuitry.

12. The projection display apparatus of claim 8 further comprising a remote control unit by which a user can remotely control operation of the projection display apparatus, including selection of a frame of display data from the data storage medium for controlling the light modulating element to form a corresponding selected display image on the projection screen.

13. The projection display apparatus of claim 12 in which the remote control unit comprises an infrared transmitter and a infrared receiver, the infrared receiver receiving infrared signals reflected from a display screen into the infrared receiver.

14. A method of operating a projection display apparatus that modulates light to form a display image on a projection screen, the projection display apparatus including a case supporting a light modulating element and a modulation controller that controls the light modulating element and includes a separable data storage medium, the method comprising the steps of:

joining the separable data storage medium to the projection display apparatus to place the separable data storage medium in data communication with the modulation controller;

selectively storing plural frames of display data on the separable data storage medium, the plural frames of display data corresponding to plural display images;

retrieving selected frames of display data from the separable data storage medium; and controlling the light modulating element in accordance with the selected frames of display data to form corresponding display images.

15. The method of claim 14 in which the plural frames of display data are generated by a remote computer and stored on the separable data storage medium.

16. The method of claim 14 further comprising editing a frame of display data and in which selectively storing plural frames includes storing the edited display data.

17. The method of claim 14 in which receiving selected frames of display data from the separable data storage medium includes remotely selecting the frames of data.

18. The method of claim 14 in which selectively storing plural frames of display data on the separable data storage medium includes programming a slide show and in which receiving selected frames of display data from the separable data storage medium includes projecting a slide show.

19. A projection display apparatus operable to form a display image on a projection screen, comprising:

a light source;

a transmissive liquid crystal display for modulating light generated by the light source to form the display image;

a display data input for receiving display data from a remote computer;

a modulation controller in communication with the light modulating element for controlling the liquid crystal display, the modulation controller including a data storage medium for selectively storing plural frames of display data received from the remote computer, the plural frames of display data corresponding to plural separate display images, the modulation controller controlling the liquid crystal display selectively in accordance with display data as it is received from the remote computer or with selected frames of display data retrieved from the data storage medium, the transmissive liquid crystal display and the modulation controller being supported by a common housing;

a remote control for communicating to the modulation controller the display data to be stored in the data storage medium and the display data to be projected from the data storage medium or the remote computer; and projection optics for projecting the display image toward the projection screen.

20. The projection display apparatus of claim 19 in which the remote control unit comprises an infrared transmitter and a infrared receiver.

21. The projection display apparatus of claim 19 in which the infrared receiver receiving infrared signals reflected from a display screen into the infrared receiver.

* * * * *